(12) United States Patent
Moore et al.

(10) Patent No.: US 8,087,607 B2
(45) Date of Patent: Jan. 3, 2012

(54) AIRPLANE CONFIGURATION

(75) Inventors: Matthew D. Moore, Everett, WA (US);
Kelly L. Boren, Marysville, WA (US);
Edward C. Marques, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/947,169

(22) Filed: Nov. 16, 2010

(65) Prior Publication Data

US 2011/0089290 A1 Apr. 21, 2011

Related U.S. Application Data

(62) Division of application No. 11/612,594, filed on Dec. 19, 2006, now Pat. No. 7,900,865.

(51) Int. Cl.
*B64C 1/40* (2006.01)
*B62D 27/00* (2006.01)

(52) U.S. Cl. ............................................ 244/1 N; 244/54

(58) Field of Classification Search .................. 244/1 N, 244/35 A, 45 R, 48, 55, 54, 129.1
See application file for complete search history.

(56) References Cited

U.S. PATENT DOCUMENTS

| | | | |
|---|---|---|---|
| 2,390,859 A | 12/1945 | Warner | |
| 2,469,619 A | 5/1949 | Warner | |
| 2,846,165 A | 8/1958 | Axelson | |
| 2,863,620 A | 12/1958 | Vautier | |
| 3,310,262 A | 3/1967 | Robins | |
| 3,576,300 A | 4/1971 | Palfreyman | |
| 3,727,862 A | 4/1973 | Kaufhold et al. | |
| 3,830,451 A | 8/1974 | Fosness | |
| 3,936,017 A | 2/1976 | Blythe et al. | |
| 4,019,699 A | 4/1977 | Wintersdorff et al. | |
| 4,036,452 A | 7/1977 | Schairer | |

(Continued)

FOREIGN PATENT DOCUMENTS

GB 1243392 8/1971

(Continued)

OTHER PUBLICATIONS

U.S. Appl. No. 11/307,271, filed Jan. 30, 2006, Office Action dated Apr. 9, 2008.

(Continued)

*Primary Examiner* — Joshua Michener
*Assistant Examiner* — Brian M O'Hara
(74) *Attorney, Agent, or Firm* — Matthew W. Witsil; Moore & Van Allen PLLC

(57) ABSTRACT

An aircraft configuration that may reduce the level of noise, infrared radiation, or combination thereof directed towards the ground from an aircraft in flight. An embodiment of an aircraft includes a fuselage, two forward swept wings, at least one engine mounted to the aircraft and higher than the wings, and vertical stabilizers mounted on each wing outboard of the outermost engine. The leading edge of the wing may extend forward of the leading end of the engine, and the trailing edge of the aft deck may extend aft of the trailing end of the engine. The aft deck may include an upwardly rotatable pitch control surface at the trailing edge of the deck. Engine types may vary, including but not limited to turbofans, prop-fans, and turbo-props. Main wings may be mounted above the longitudinal axis of the fuselage, and canards may likewise be mounted above or below the axis.

24 Claims, 22 Drawing Sheets

U.S. PATENT DOCUMENTS

| | | | |
|---|---|---|---|
| 4,093,156 | A | 6/1978 | Coe |
| 4,171,786 | A | 10/1979 | Krenz |
| 4,311,289 | A | 1/1982 | Finch |
| 4,447,022 | A | 5/1984 | Lion |
| 4,449,680 | A | 5/1984 | Gratzer et al. |
| 4,767,083 | A | 8/1988 | Koenig et al. |
| 4,836,469 | A | 6/1989 | Wagenfeld |
| 5,034,751 | A | 7/1991 | Miller |
| 5,348,256 | A | 9/1994 | Parikh |
| 5,495,999 | A | 3/1996 | Cymara |
| 5,529,263 | A | 6/1996 | Rudolph |
| 5,738,298 | A | 4/1998 | Ross et al. |
| 5,842,666 | A | 12/1998 | Gerhardt et al. |
| 5,899,409 | A | 5/1999 | Frediani |
| 6,102,328 | A | 8/2000 | Kumata et al. |
| 6,308,913 | B1 | 10/2001 | Fujino et al. |
| 6,532,729 | B2 | 3/2003 | Martens |
| 6,575,406 | B2 | 6/2003 | Nelson |
| 6,817,571 | B2 | 11/2004 | Retz et al. |
| 6,824,092 | B1 | 11/2004 | Franklin et al. |
| 6,843,450 | B2 | 1/2005 | Bath |
| 6,921,045 | B2 | 7/2005 | Chang |
| 6,929,216 | B2 | 8/2005 | Bath et al. |
| 2003/0052228 | A1 | 3/2003 | Sankrithi |
| 2004/0007647 | A1 | 1/2004 | Dong |
| 2008/0258005 | A1* | 10/2008 | Gall et al. ............... 244/55 |

FOREIGN PATENT DOCUMENTS

| | | |
|---|---|---|
| GB | 1463810 A  * | 2/1977 |

OTHER PUBLICATIONS

U.S. Appl. No. 11/307,271, filed Jan. 30, 2006, Office Action dated Sep. 30, 2008.

Matthew D. Moore, et al., U.S. Appl. No. 11/307,271; non-final Office Action, dated Feb. 2, 2009.

Meyer Reshotko, Jack H. Goodykoontz and Robert G. Dorsch, "Engine-Over-the-Wing Noise Research", J. Aircraft, Apr. 1974, pp. 195-196, vol. 11, No. 4.

"Noise-Reduction Benefits Analyzed for Over-the-Wing-Mounted Advanced Turbofan Engine (Synopsis)", www-paso.grc.nasa.gov/Library/Abstracts/berton6.hmtl, Jan. 20, 2006, pp. 1-2.

Mizrahi, "Flight to the Future", Jan. 20, 2006, www.twitt.org/bldwing.htm, pp. 1-9.

"Stealth Aircraft the Technology behind the planes", www.seorf.ohiou.edu, Jan. 20, 2006, pp. 1- 12.

Geoffrey A. Hill and Russell H. Thomas, "Challenges and Opportunities for Noise Reduction Through Advanced Aircraft Propulsion Airframe Integration and Configurations", 8th CEAS Workshop: Aeroacoustics of New Aircraft and Engine Configurations, Budapest, Hungary, 2004, pp. 1-13.

Matthew D. Moore, et al., U.S. Appl. No. 11/307,271; final Office Action, dated Aug. 18, 2009.

* cited by examiner

AIRPLANE CONFIGURATION

CROSS-REFERENCE TO RELATED APPLICATION

This application is a divisional of co-pending patent application Ser. No. 11/612,594, filed Dec. 19, 2006 and titled "Airplane Configuration," the entire disclosure of which is hereby incorporated by reference.

BACKGROUND OF THE INVENTION

This invention relates to the field of aircraft design, and more particularly to an airplane configuration in which an engine is wholly above a wing, aft deck, or combination thereof and at least in part between vertical stabilizers.

Aircraft engines generate sound and heat in their operation. Excessive sound is undesirable largely because of disturbance to surrounding communities. Heat is undesirable particularly in both military and civil aircraft, which may be tracked by ground-based missiles that seek heat in the form of infrared radiation. The design of the aircraft profoundly impacts the sound and heat that are observed from the ground.

Conventional subsonic civil aircraft designs commonly feature engine placement underneath the airplane's wings. The sound pressure level produced by the engines, herein generally referred to as noise, and particularly engine noise or the "roar" heard at takeoff, travels largely unabated to communities. For under-wing engine installations this noise is amplified by the under-surface of the wing because the portion of the sound produced by the engines that would otherwise radiate upward is reflected downward off of the under-surface. The engine plume interacts with the wing trailing edge. Both the under-surface reflection and the engine plume interaction with the wing trailing edge add to the overall noise heard below. Even when engines are located higher than wings, aircraft generally offer little in the way of impeding the downward travel of sound due to the absence of a surface that covers a substantial extent of the downward sound propagation path. Technological improvements in engines have resulted in a gradual reduction of engine noise over time, but further reductions based on similar improvements will likely be minimal.

Heat similarly radiates from aircraft engines. Some conventional airplane designs having the engines mounted beneath the wings, or the exhaust at the rear end of the aircraft, radiate heat unimpeded to the ground. This issue is exacerbated by the conventional under-wing mount, because radiant heat energy also reflects off the pylon and underside of the wing, much like noise energy.

Transportation and traffic planners frequently call for increasing dependence on regional passenger air transportation to serve substantial areas extending out from major international airport hubs. Aircraft having relatively slow cruise speeds, such as less than about 0.8 mach, and relatively small passenger counts, such as less than about 150 passengers, are often referred to as "regional" aircraft. Regional air transportation poses community environment intrusion as operations are confined within lower speed regimes that result in longer exposure times, at lower altitude ceilings, and over a much larger swath of communities than ever before. Communities in general have become increasingly sensitive to extended exposures to noise and to air safety concerns.

In addition to use as civilian passenger transports, regional jets are used for transport of military commanders and government officials, and are also being evaluated as surveillance platforms. In these military configurations, the regional jet flight regimes and likelihood of operating in increasing hostile threat environments will likely expose the aircraft, at some point, to vehicle-transported and man-portable infrared (IR) air defense systems, which can track and guide on the heat radiated by the aircraft. Asymmetric and non-state threat organizations also exist with access to similar man-portable missiles that could be used to attack civilian aircraft at some time in the future. Defensive systems studies show benefits to reducing or shadowing aircraft signature sources and to giving protective equipment, typically installed on the underside of the aircraft, clear sight lines to the oncoming threat by relocating low hanging engine nacelles and their exhaust plumes.

Another emergent issue associated with increased traffic frequency is the noise produced by thrust-reversing systems. The issue is compounded both by increased traffic and how thrust reversing systems are employed in maximizing operational efficiency. While designed primarily for wet, icy, and slippery runways, airlines often use thrust reversing systems to reduce the time it takes to get to the gate by decelerating quickly to catch early exits and taxiways that are closer to the terminal, as opposed to completing deceleration at the end of the runway and taxiing back to the terminal. Thrust reversing events are typically low frequency in nature, can be heard up to a mile from the airport, and have been demonstrated to cause structure rattle in buildings close to the airport.

BRIEF SUMMARY OF THE INVENTION

In accordance with an embodiment of the present invention, an aircraft includes a tubular fuselage, two forward swept wings, at least one engine mounted to the aircraft and higher than the wings, and vertical stabilizers mounted on each wing outboard of the outermost engine. Accordingly, the present invention may reduce the level of noise, infrared radiation, or both directed towards the ground from an aircraft in flight.

In accordance with another embodiment of the present invention, an aircraft includes a tubular fuselage, two forward swept wings, a plurality of engines mounted to the aircraft wholly above the wings, vertical stabilizers mounted on each wing outboard of the outermost engine, and an aft deck. Each vertical stabilizer extends at least as high as the central axis of the highest engine, at the lowest point of that engine, and the vertical stabilizers further extend from the leading edge to the trailing edge of the wing. The aft deck includes an upwardly rotatable pitch control surface at the trailing edge of the deck.

In accordance with another embodiment of the present invention, a method of making an aircraft with reduced aircraft noise, infrared radiation, or both, emitted towards the ground from the aircraft in flight is provided. The method includes mounting an engine to the aircraft above a wing. The engine includes a nacelle and the wing extends forward of the inlet of the nacelle and aft of the exhaust of the nacelle a distance at least as great as the vertical distance between the upper surface of the wing and the top of the nacelle. An aft deck is provided that extends from the wing and includes a trailing edge extending aft of the exhaust of the nacelle a distance at least as great as the vertical distance between the upper surface of the wing and the top of the nacelle.

The features, functions, and advantages can be achieved independently in various embodiments of the present invention or may be combined in yet other embodiments.

DETAILED DESCRIPTION OF THE INVENTION

Figure 1:
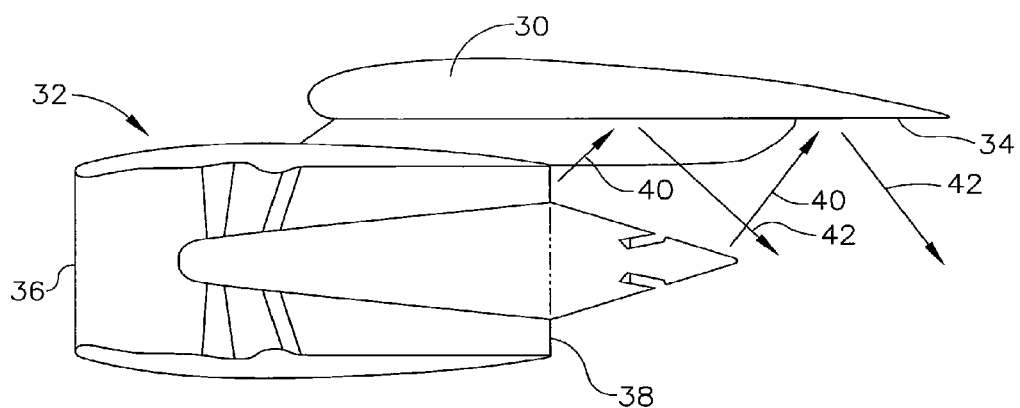
FIG. 1 is a cross-section view of a prior art wing and engine configuration.

The following detailed description of preferred embodiments refers to the accompanying drawings that illustrate specific embodiments of the invention. Other embodiments having different structures and operations do not depart from the scope of the present invention.

In the Figures herein, unique features receive unique reference numerals, while features that are the same in more than one drawing receive the same reference numerals throughout. The scope of the invention is not intended to be limited by materials, but may be carried out using any materials that allow the construction and operation of the present invention. Materials and dimensions depend on the particular application. The embodiments of the present invention may be used for any aircraft, whether private, commercial, or military, of any size.

Jet engines are shrouded turbofans. With escalation in fuel prices, interest in highly efficient next-generation turbo-prop (or turbo-shaft) and prop-fan propulsion systems has greatly increased. For clarity, "turbo-prop" or "turbo-shaft" refer to single propellers driven by an arbitrary power source providing shaft-horsepower to the propeller that could include a gas turbine, internal combustion engine, or other engine. "Prop-fan" refers to a two-stage opposite (sometimes referred to as counter or contra) rotation propeller system, which is sometimes referred to as a fan system, that is also driven by an arbitrary engine delivering shaft horsepower to the propellers.

Despite high efficiency, prop-fan powered airplanes have not been practical to-date primarily due to community and cabin noise, and passenger acceptance of open (un-shrouded) propellers in close proximity and visibility to the cabin. Turbo-prop aircraft have been in-service for many years but have achieved only limited success for these same inherent reasons, albeit less severe. Many existing turbo-prop aircraft in service today place wing-mounted propulsors located at roughly the mid-cabin of the airplane. In this configuration, the rotors/propellers are often visible to the passengers with the blade tips often rotating in close proximity to the aircraft fuselage skin. While the aircraft are certified to current safety standards, passengers have displayed clear discomfort in sitting in the proximity of a propeller both from a perceived safety issue and very real noise issue, and accordingly trends have shown that passengers clearly prefer and will travel on jet powered transports when a choice is available.

Figure 2:
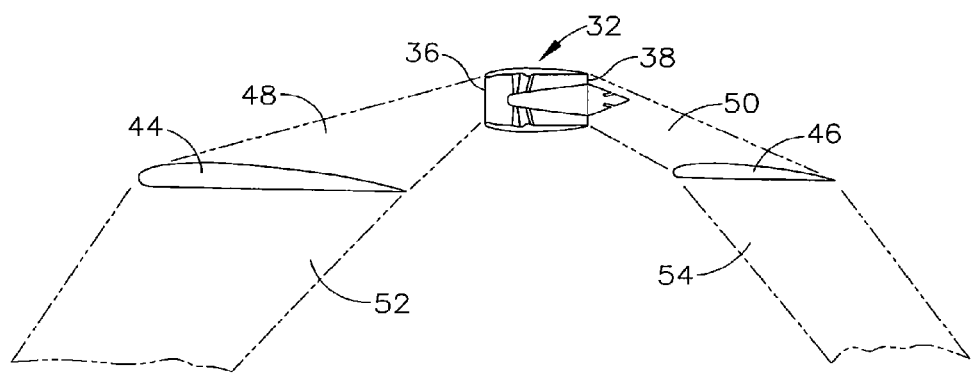
FIG. 2 is a cross-section view of another prior art wing and engine configuration.

Referring to the drawings, FIG. 1 shows a cross-section of a wing 30 and engine 32 showing a prior art configuration, with the engine 32 mounted to the underside 34 of the wing 30. In addition to the unimpeded path of noise and heat, or infrared radiation, to the ground from both the intake 36 and exhaust 38 of the engine, sound and heat are directed 40 to the underside 34 of the wing 30 and are reflected 42 downward, increasing the noise and heat that are observed from the ground. FIG. 2 shows a prior art wing and engine 32 configuration where the engine 32 is mounted to the fuselage of the airplane higher than the wings 44, 46, which are fore and aft of the engine 32. Portions of the noise and heat 48, 50 emitted by the engine are blocked from the ground by the wings 44, 46. Shadow zones 52, 54 result from the wings 44, 46 blocking noise and heat, but the shadow zones 52, 54 provide relatively little impedance to noise and sound in that the wings 44, 46 do not extend below either the intake 36 or the exhaust 38 of the engine.

Figure 3:
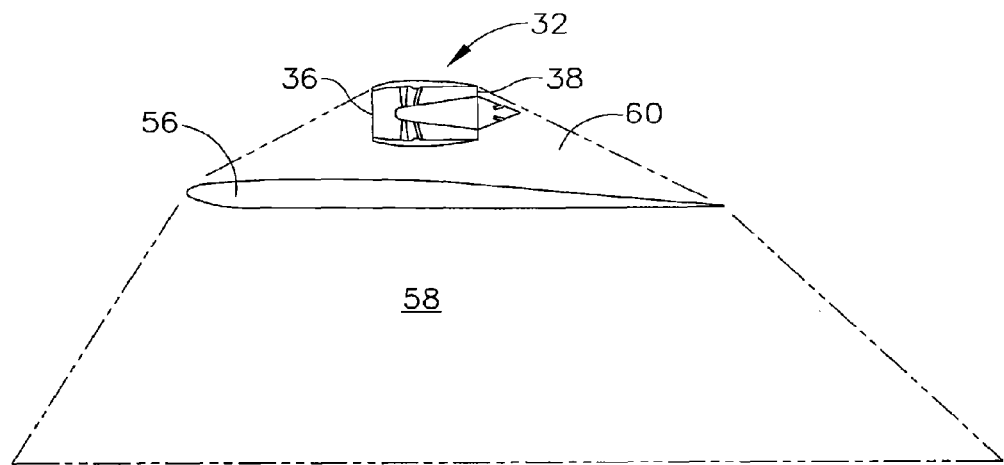
FIG. 3 is a cross-section view of a wing and engine configuration in accordance with an embodiment of the present invention.
Figure 4:
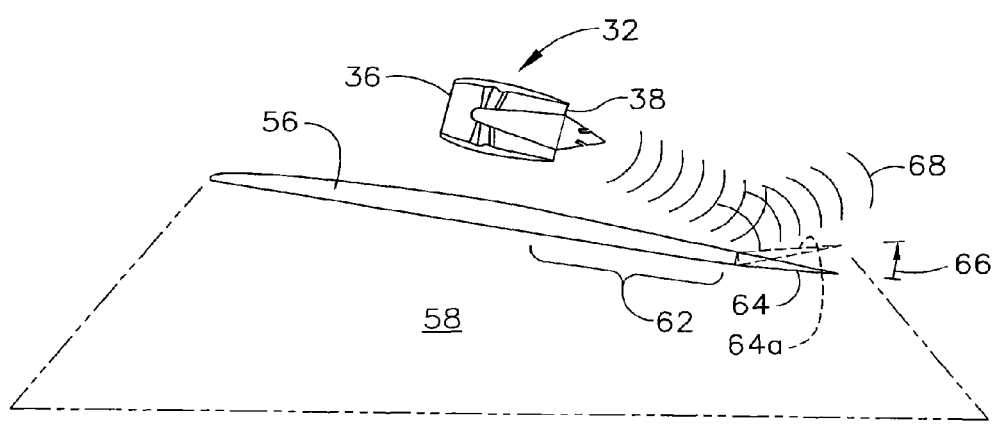
FIG. 4 is a cross-section view of a wing, aft deck, and engine configuration in accordance with an embodiment of the present invention.

FIG. 3 shows an engine and wing configuration in accordance with the present invention, where the engine 32 is located above the wing 56. The wing 56 may extend fore and aft of the engine 32 to create a shadow zone 58 that is continuous, with rearward, underneath, and forward shielding of noise and heat 60 from the ground. FIG. 4 shows another configuration that may be part of the same aircraft as FIG. 3, where the wing 56 may extend to an aft deck 62. At the trailing end of the aft deck 62 there may be an upwardly rotatable pitch control surface 64. This pitch control surface 64 may be rotated to an upward position. Upwardly rotated pitch control surface 64a extends the shadow zone 58 and deflects noise and heat energy 68 upward when the wing 56 and aft deck 62 are at an upward angle as shown, as in takeoff and approach.

FIGS. 5-10 are views of an embodiment of an aircraft 70 in accordance with the present invention. The aircraft 70 may include a tubular fuselage 72 having a longitudinal axis 73 (FIG. 6), a pair of forward swept wings 74, 76, a pair of jet engines 78, 80, a pair of vertical stabilizers 82, 84, an aft deck 86, 88 on each side of the fuselage 72 with pitch control surfaces 90, 92, and a pair of canards 94, 96.

The jet engines 78, 80, i.e. shrouded turbofan engines, may be mounted above the forward swept wings 74, 76. In one embodiment, the engines 78, 80 may be mounted to the wings 74, 76 with vertical struts or pylons. Aerodynamic integration of engines wholly mounted over large surfaces, and in particular to wings, however, can be difficult due to the interaction of the flow with the upper wing surface, strut, and nacelle. Higher speeds exacerbate these effects. The engines 78, 80 may be mounted to the fuselage 72 with structural members 98, 100. The position of the engines 78, 80 above the wings 74, 76 and not connected to the wings 74, 76 allows air over the wings 74, 76 to pass freely. This may maximize lift production of the wings 74, 76 without undue interference from the engines 74, 76. A boundary layer, which is the flow adjacent to the wing surface that is less than 99% of the free stream flow, forms on top of the wing 74, 76, and the engine 78, 80 does not intersect this boundary layer.

There may be a "close-out" of the fuselage 72 forward of the engines 78, 80 allowing supports 98, 100 for the fuselage-mounted engines 78, 80 to pass through the fuselage 72. This may provide structural benefits such as may be realized from, for example, connecting the supports 98, 100 for the engines 74, 76 to each other or to other structural members within the fuselage 72. As an alternative, there may be only one engine, mounted on the top of the fuselage 72 and still longitudinally located such that the wings 74, 76 are outboard of the engine. Or, additional engines could be provided so that there is, for example, a pair of engines on each side of the fuselage 72.

Figure 5:
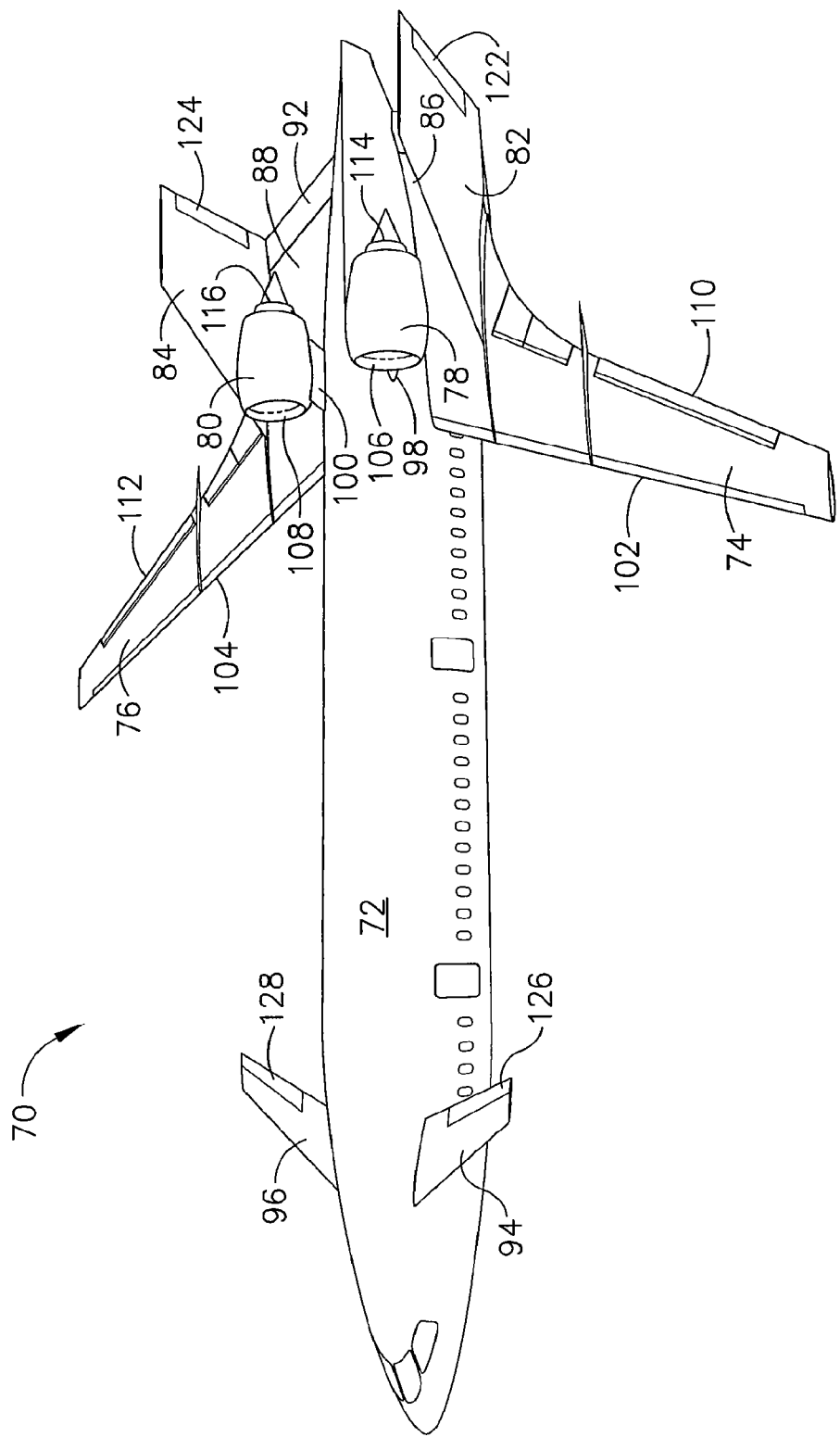
FIG. 5 is a downward perspective view of an airplane including turbofan engines in accordance with an embodiment of the present invention.
Figure 6:
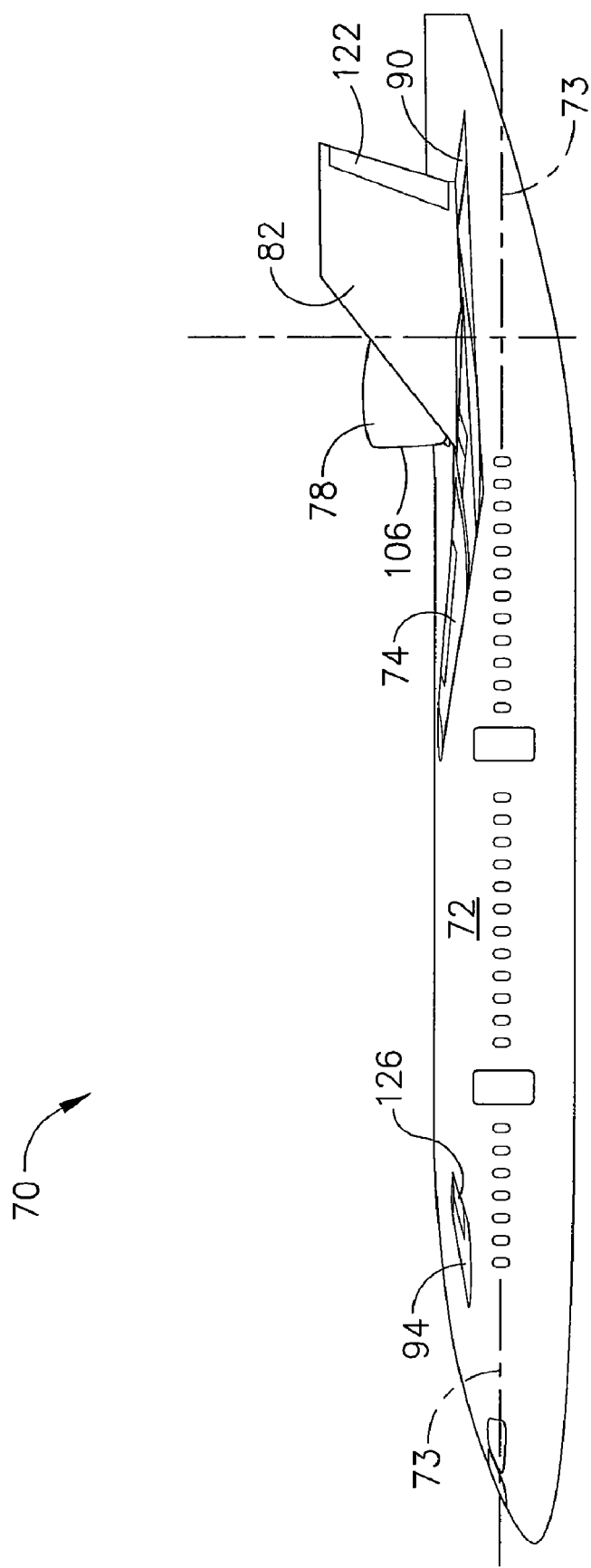
FIG. 6 is a side elevation view of the airplane of FIG. 5.
Figure 7:
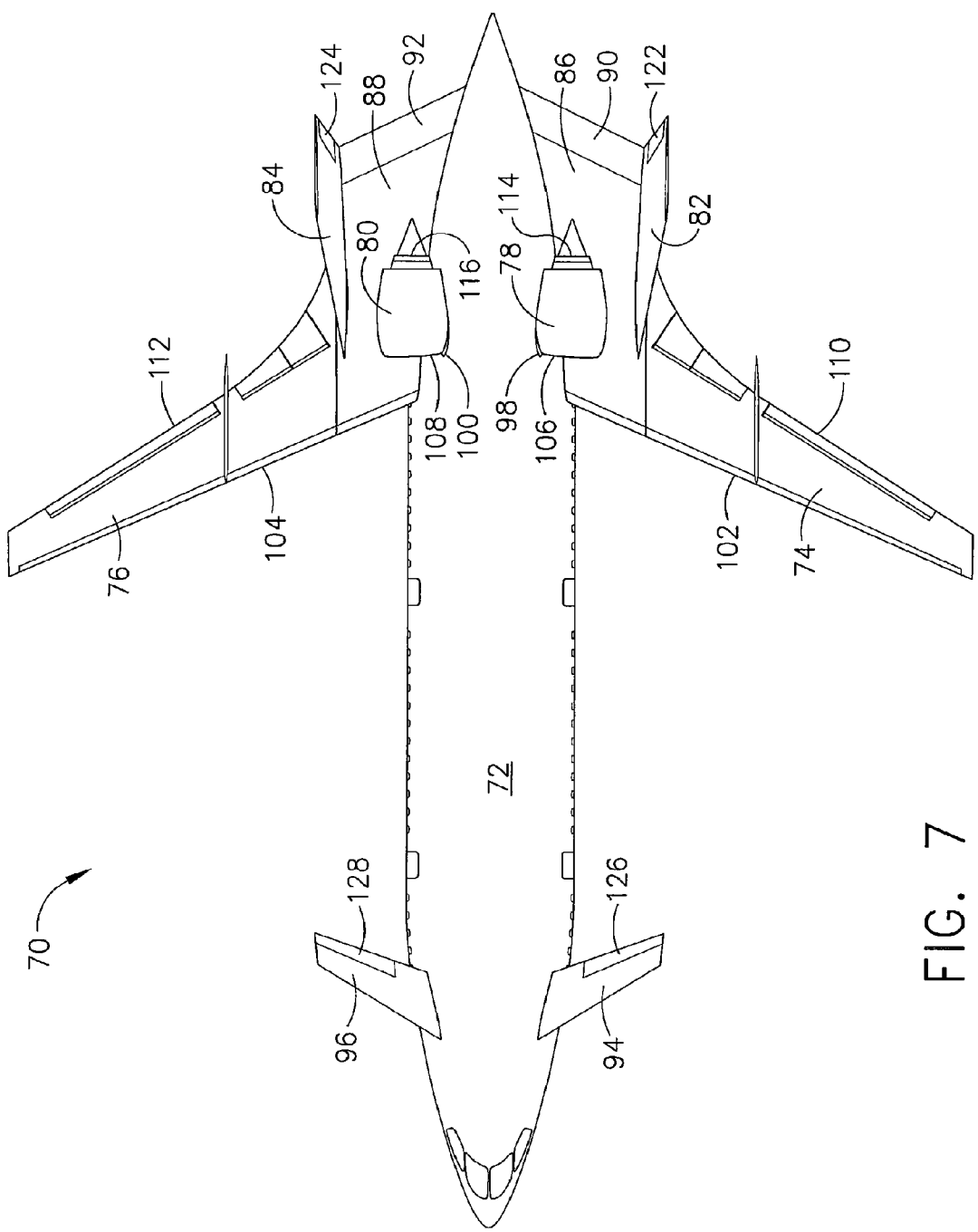
FIG. 7 is a top plan view of the airplane of FIG. 5.
Figure 8:
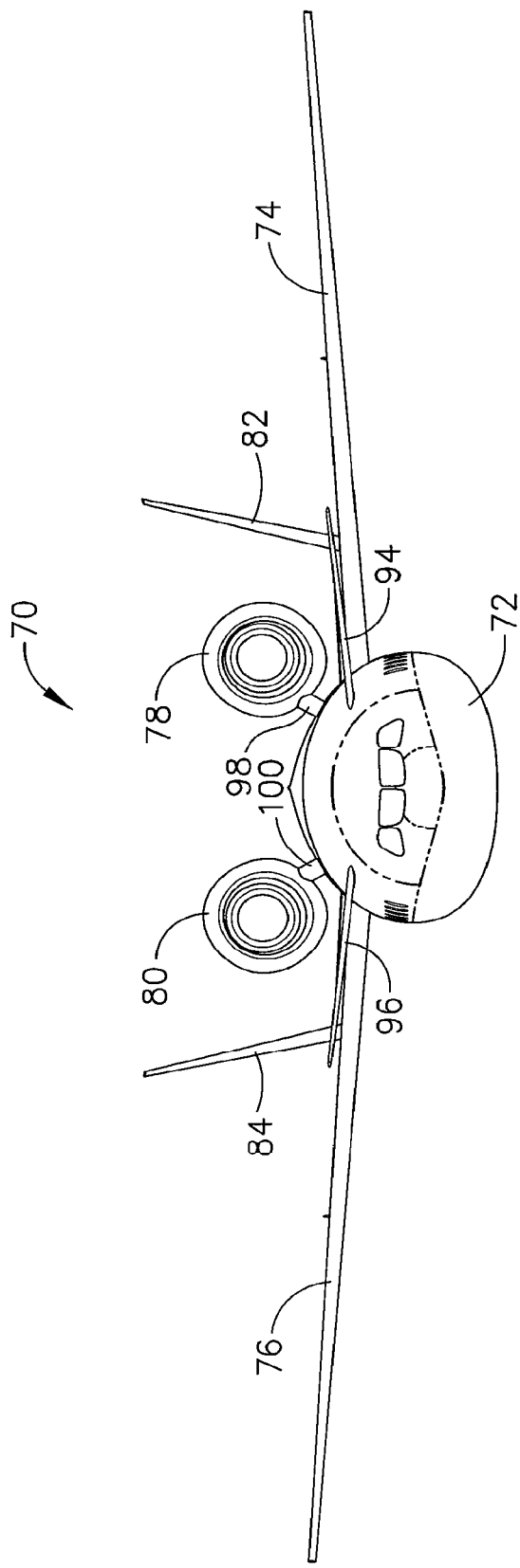
FIG. 8 is a front elevation view of the airplane of FIG. 5.
Figure 9:
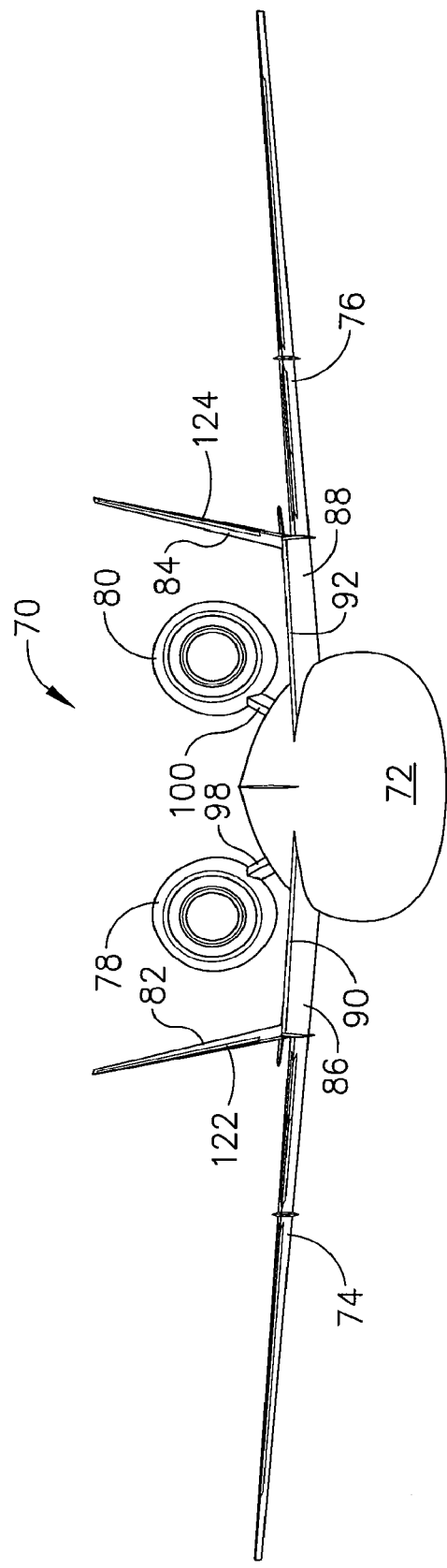
FIG. 9 is a rear elevation view of the airplane of FIG. 5.
Figure 10:
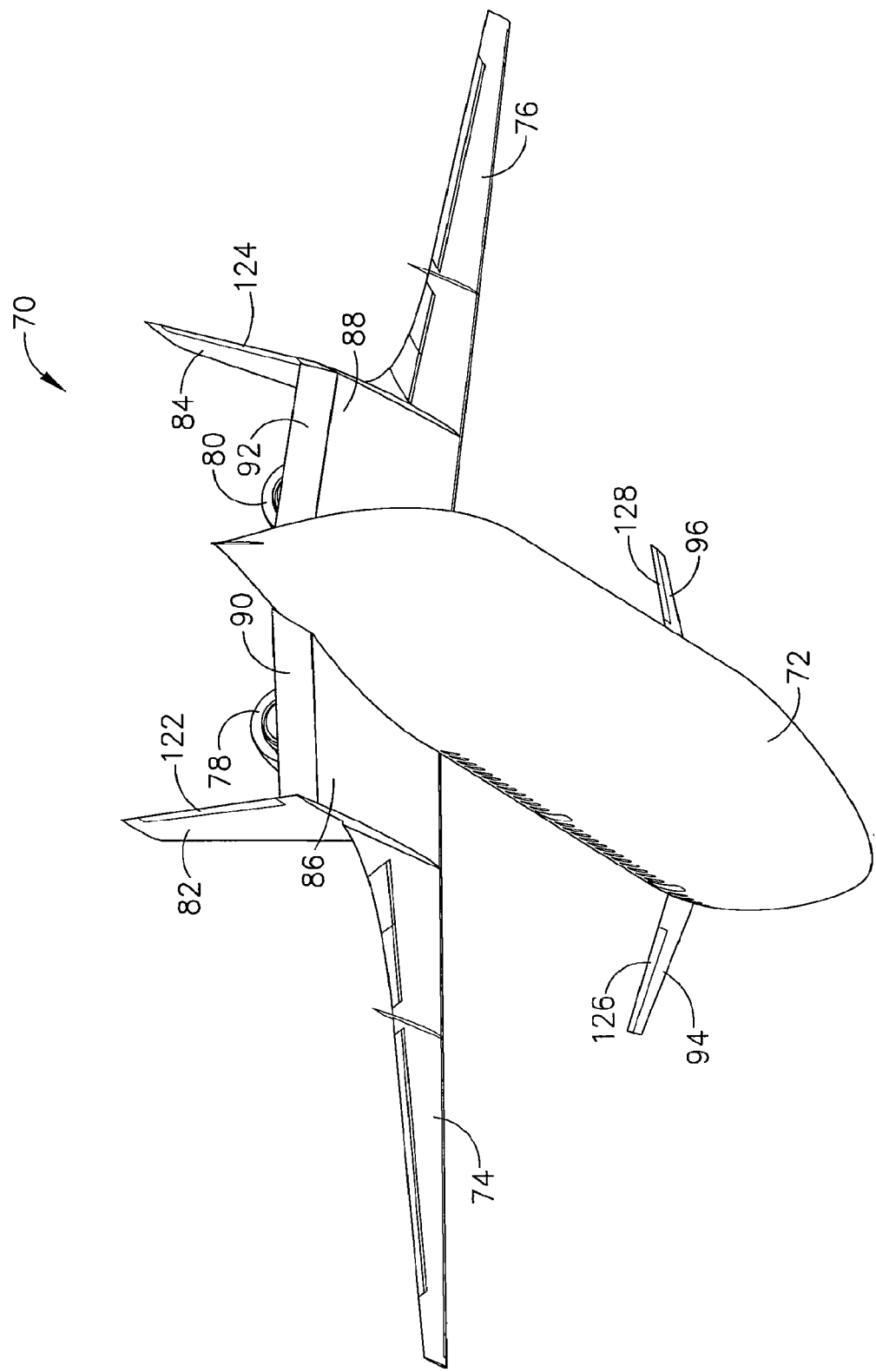
FIG. 10 is an upward perspective view of the airplane of FIG. 8.

The relative positions of the engines 78, 80 and wings 74, 76 may be selected to shield noise and heat from the ground to the degree possible while maintaining desired flight characteristics of the aircraft 70. As best shown in FIGS. 5 and 7, the leading edge 102, 104 of the wing 74, 76 extends ahead of the intakes 106, 108 of the engines 78, 80 and the trailing edge of the aft deck 86, 88 extends past the engine exhausts 114, 116 to achieve the effect shown in FIG. 3. To accomplish this configuration, in particular for, but not limited to, regional, small to mid-size aircraft, a forward swept wing design is desirable. The wings 74, 76, and fuselage 72, shield forward heat radiation from engine intake 106, 108 anti-icing systems.

The vertical positions of the wings 74, 76 may be above the longitudinal axis 73 of the fuselage 72. Such relatively high wing placement may enable the aircraft to have lower overall position relative to the ground, good rotation characteristics, and access to systems in the tail-cone/blade. The high wing placement may also reduce the number of threat related systems required for full-field-of-vision, thereby reducing cost of such systems if required by the customer. A comparable low wing airplane may require longer landing gear and also increase wing area and weight due to the need to store the main landing gear in the wing. With respect to threat related systems, a traditional low wing airplane may require multiple distributed systems that add weight and cost.

Also as shown, the mounting of the engines 78, 80 to the fuselage may be made approximately one third of the distance down from the top of the fuselage 72 to the longitudinal axis. The respective positions of the wings 74, 76 and the engines 78, 80 may be modified as determined by one of ordinary skill in the art.

Outboard of each outermost engine is a vertical stabilizer 82, 84. The vertical stabilizers 82, 84 shield lateral travel of noise and heat, and may include rudders 122, 124 for directional control. As shown, the vertical stabilizers 82, 84 are taller than the uppermost point of the nacelles of the engines 78, 80, but the height may be as selected by one of ordinary skill in the art. One criterion may be for the vertical stabilizer 82, 84 to extend at least as high as the longitudinal axis of the highest engine, as measured at that engine's lowest point. The preferred acoustic geometry for the vertical stabilizers 82, 84 is for the geometric center of the vertical stabilizer tip to be located at the fan nozzle exit or confluent nozzle exit 114, 116.

The minimum vertical stabilizer chord may be such that the mid-span of the vertical stabilizer 82, 84 extends at least 1 fan diameter aft of the fan nozzle or confluent nozzle exit 114, 116. The sweep of the vertical stabilizer 82, 84 may be independent so long as the tip criterion of 1 fan diameter is maintained. The height of the vertical stabilizer 82, 84 may be, for example, nominally 5% of the fan diameter higher above the fuselage 72 than the vertical height of the fan nozzle exit or confluent nozzle exit 114, 116. The vertical stabilizers 82, 84 may be fixed with movable yaw-control surfaces or can be wholly rotating, in which case they can also be rotated in a partial (or completely perpendicular) attitude with the freestream to provide additional drag and braking during runway deceleration after touch-down.

The aft deck, in two portions 86, 88 is an extension of the central rear portion of the wings 74, 76. The pitch control surface 90, 92 includes an elevator on each portion 86, 88 of the aft deck. The elevators may be non-structural devices. Rotating the pitch control surfaces 90, 92 upward, as may best be seen in FIG. 10, may substantially block acoustic and thermal lines of sight to the engines and provides the effect of blocking and reflecting noise and heat as shown in FIG. 4. The pitch control surface 90, 92 may extend approximately the entire distance between the fuselage and each vertical stabilizer 82, 84.

Canards 94, 96 provide vertical lift at the front of the aircraft 70. The preferred placement of the canards may be chosen to best maximize performance and minimize wake vortex ingestion into the engines with goals of minimum impact to airport compatibility and pilot visibility. Accordingly the canards may be mounted higher than the longitudinal axis 73 of the aircraft 70, as shown, or lower than the axis. The canard design, in particular the span, may be chosen such that the tip vortex is not ingested into the propulsor under nominal airport noise conditions (under, for example, 4000 feet altitude and less than 250 knots air speed). In cases where noise due to vortex ingestion from a high mounted canard cannot practically be mitigated through span optimization, or in cases where a high mounted canard has an unacceptable impact on the forward cabin, an alternate low mounted canard may be preferred.

To maximize performance for a given vertical canard location the canards may be, for example, straight (zero sweep), forward, or rearward swept. Specific dihedral angles, spans, tip extensions, or tip treatments may be employed to satisfy airport infrastructure needs, and may promote drag reduction, disruption of tip vortex formation, or purposeful guidance of vortices and wakes away from sensitive regions of the engines, propellers, and fans. The canards may also be as shown, fixed with hinged control surfaces 126, 128. A fixed canard with a hinged control surface is analogous to a typical fixed wing with movable leading or trailing edges. The use of actuated canards as control surfaces in conjunction with forward swept wings may enable an airplane with inherently better lifting capability than conventional un-swept wings designed to the same span constraints. This may provide greater regional airport/short runway performance that may otherwise require a much greater equivalent span to achieve the same performance.

Figure 11:
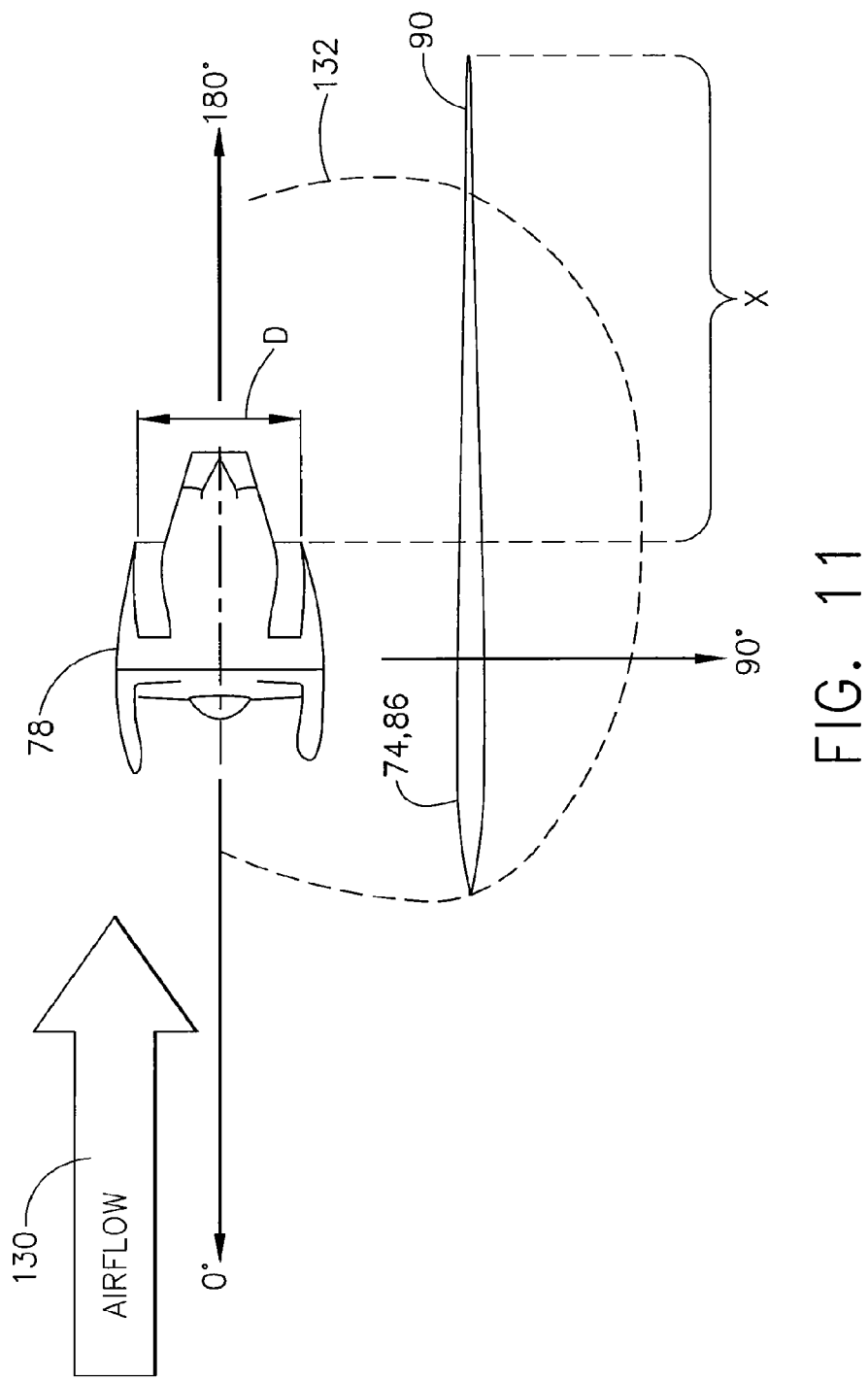
FIG. 11 is a top plan view of a turbofan engine and the horizontal trailing edge of the airplane of FIG. 5.
Figure 12:
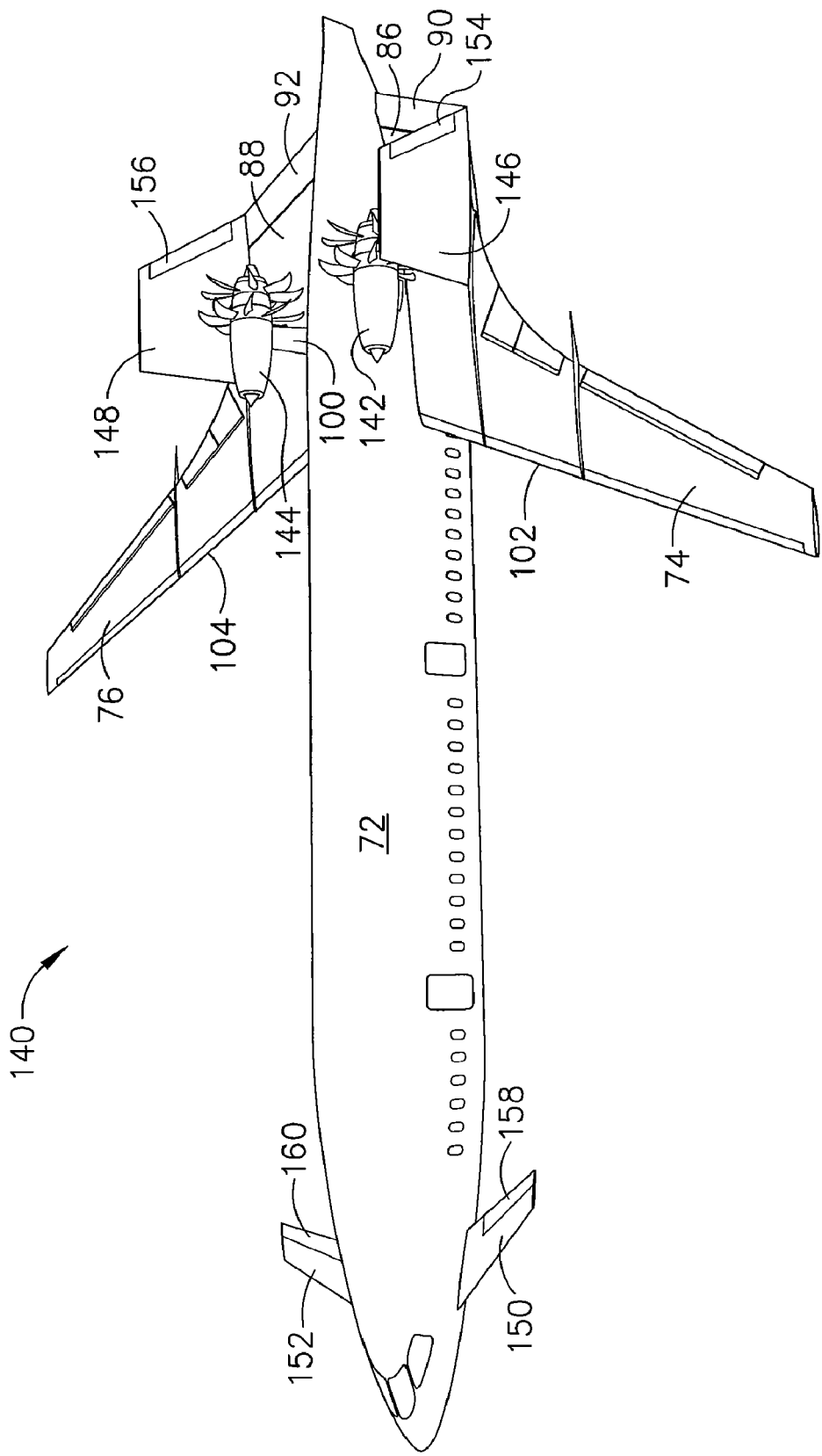
FIG. 12 is a downward perspective view of an airplane including contra-rotating propeller, prop-fan engines in accordance with an embodiment of the present invention.
Figure 13:
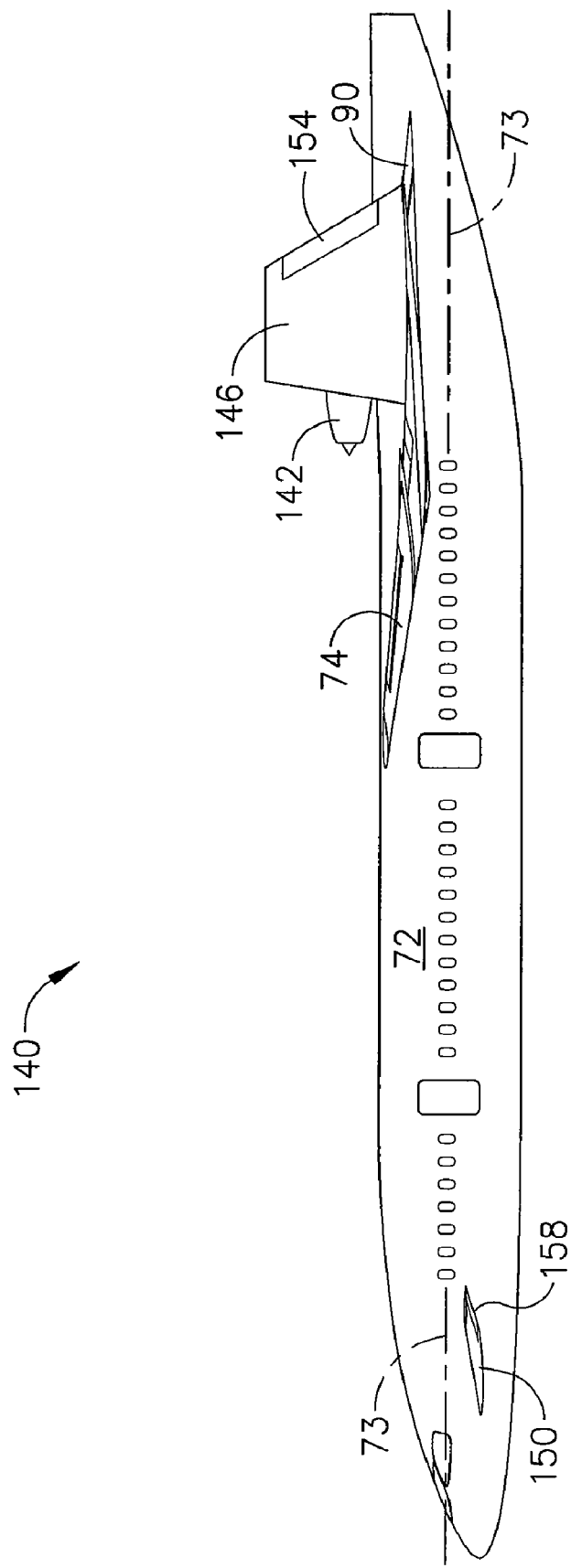
FIG. 13 is a side elevation view of the airplane of FIG. 12.
Figure 14:
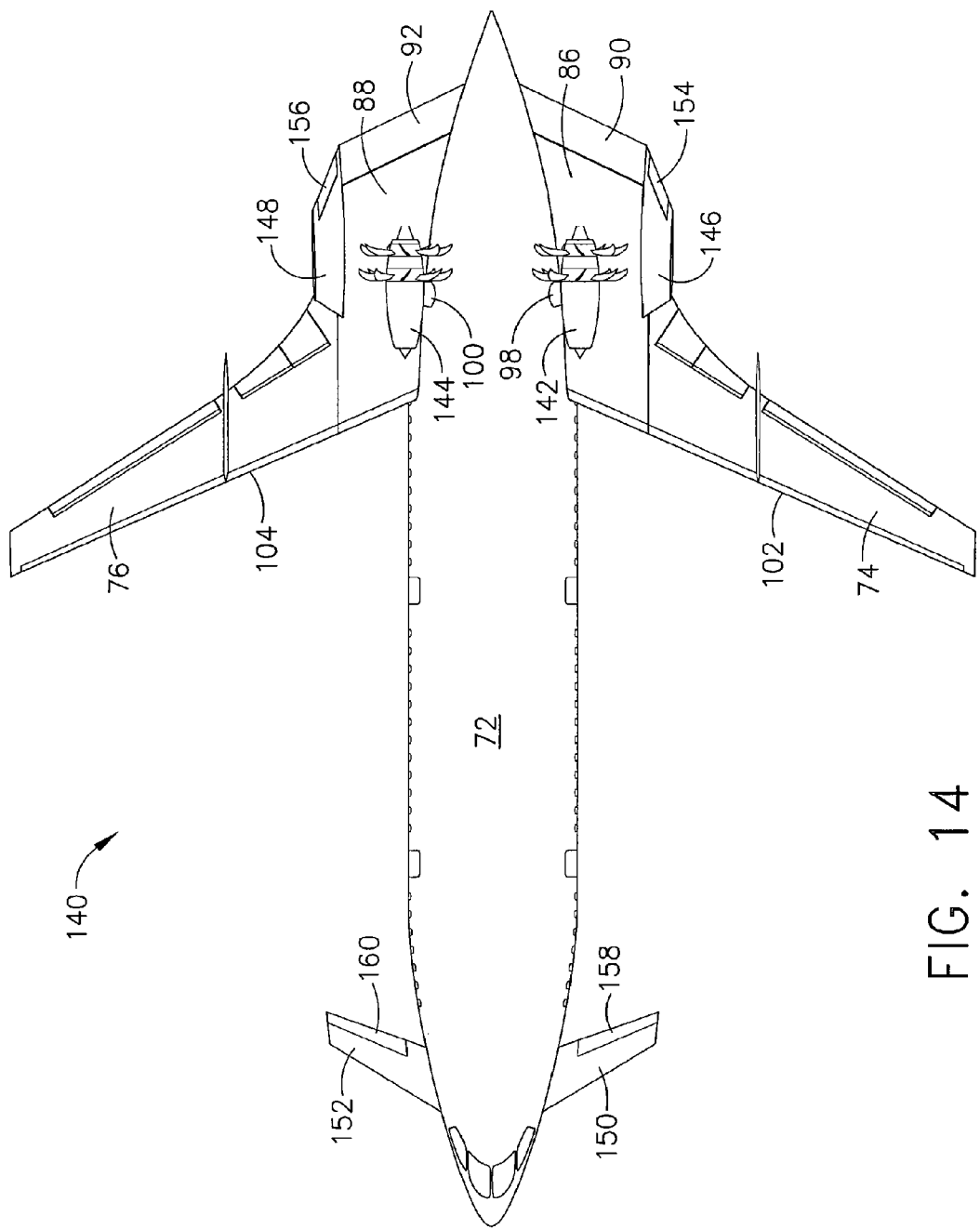
FIG. 14 is a top plan view of the airplane of FIG. 12.
Figure 15:
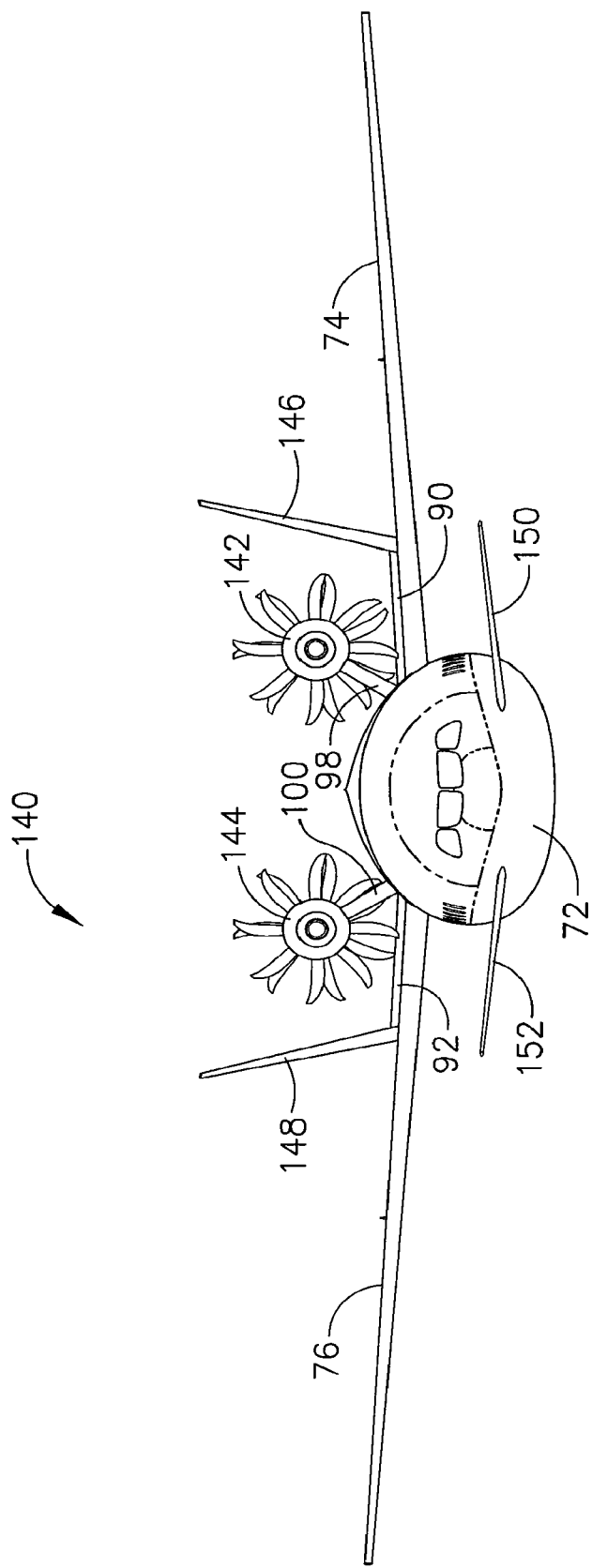
FIG. 15 is a front elevation view of the airplane of FIG. 12.
Figure 16:
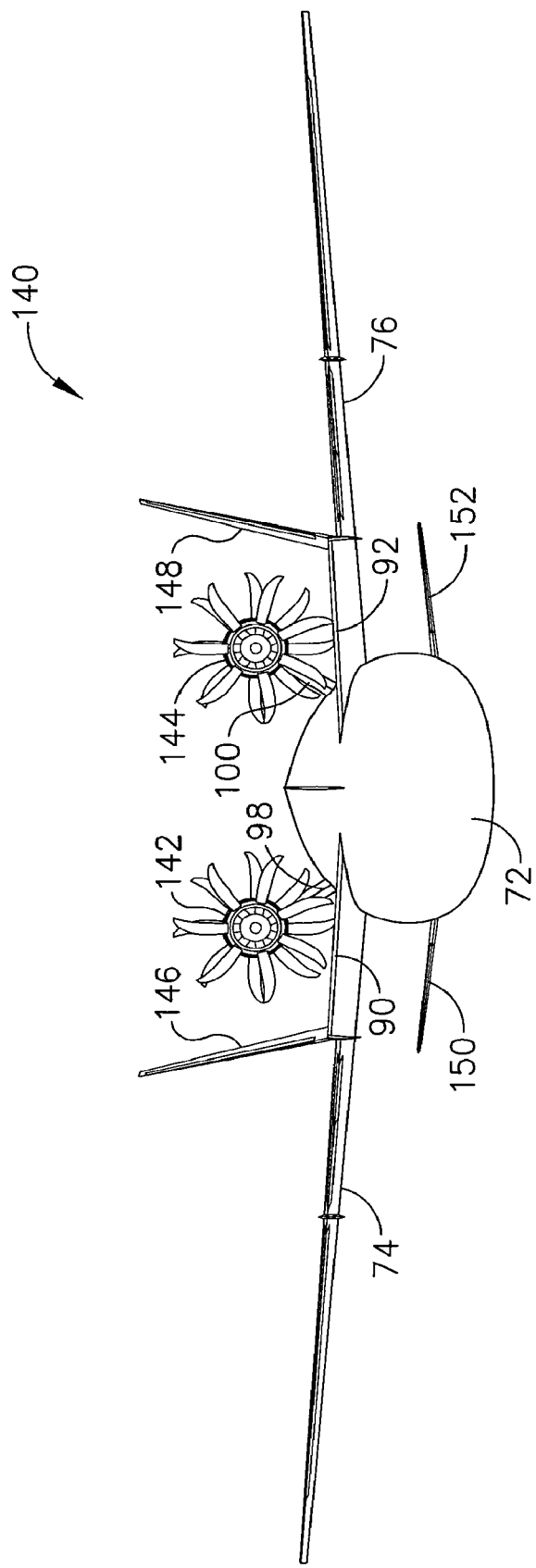
FIG. 16 is a rear elevation view of the airplane of FIG. 12.
Figure 17:
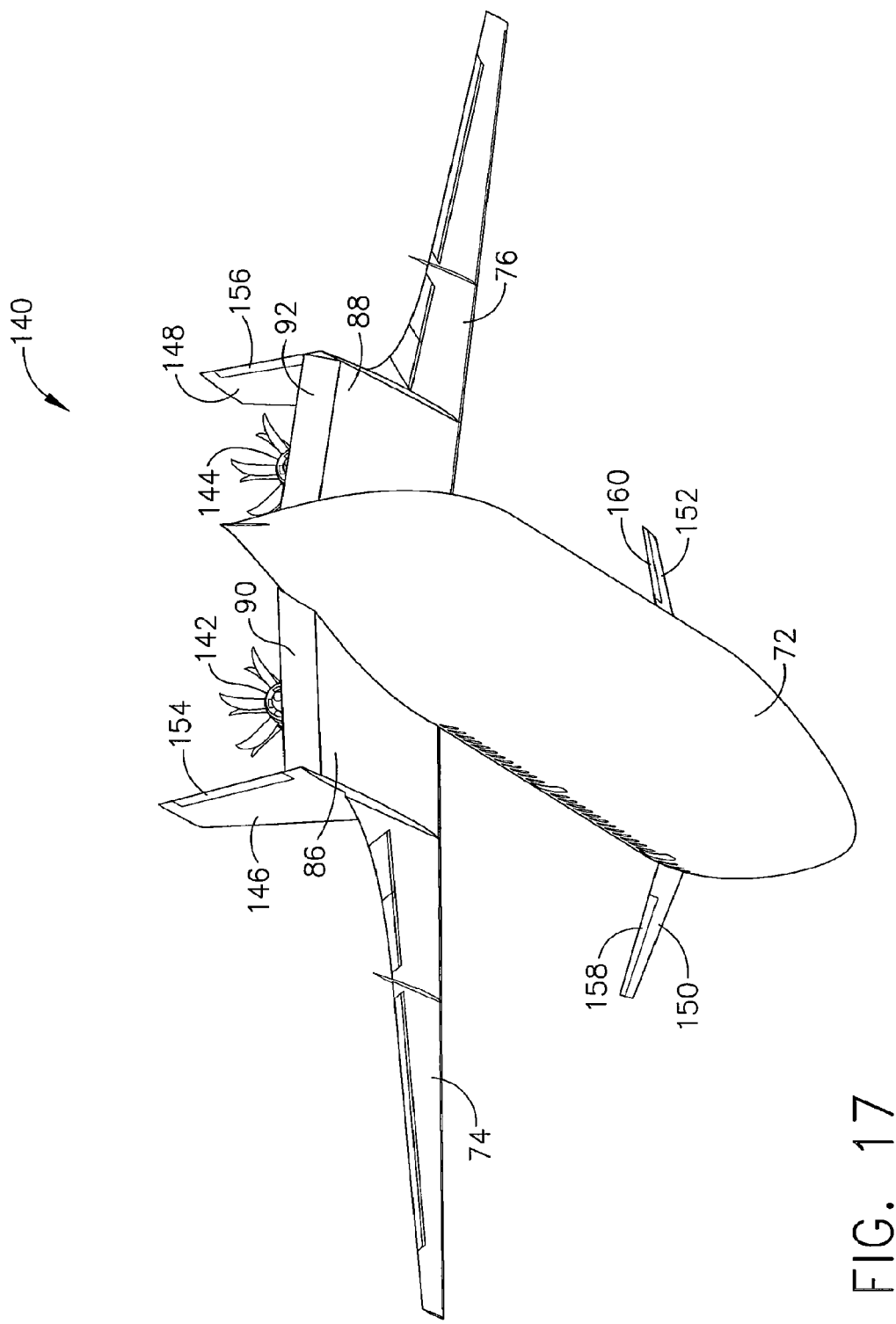
FIG. 17 is an upward perspective view of the airplane of FIG. 12.

As shown in FIG. 11, in a preferred relationship the distance X between the fan or confluent nozzle and the horizontal/beavertail 90 trailing edge may extend a minimum of nominally 4 fan/confluent nozzle diameters D for bypass ratios equal to about 2 or less, and a minimum of nominally 2.5 fan/confluent nozzle diameters D for bypass ratios greater than about 10. The preferred forward sweep of the main wings 74, 76 may be greater than 15° for additional shielding capability, but less sweep can still be effective. To facilitate optimum forward and lateral shielding and performance, the main wings 74, 76 may have upward dihedral.

Also as shown in FIG. 11, in regards to acoustics, if one considers an axis parallel to the engine axis, with zero degrees being a vector pointed at the nose of the airplane and 180 degrees pointed at the tail of the airplane and in the direction of airflow 130, this describes the industry standard acoustic polar arc system. An observer is affected by noise radiating in angles from 0 to 180 degrees. Noise can be directly radiated from the engine or reflected from a surface. Its source location is typically referenced to the grid origin, which is a reference point on the engine, generally on the centerline axis just behind the first fan or propeller rotor. Depending on the propulsor design and combination of airplane configuration and power condition, the peak noise concentration can dominantly be biased toward the front, middle, or rear or the engine, or evenly spread. A similar phenomenon exists for the thermal energy targeted by systems such as man-portable air defense systems. Airplane features presented in this design may help to maximize departure condition shielding, and in addition, high approach shielding may be achieved.

The curved, dashed line 132 represents the relative magnitude of sound over the polar arc for the depicted engine type, with the line farther away from the origin representing greater noise. "Aft-radiated" noise and infrared radiation is radiated over polar arcs/observer angles between 90 and 180 degrees. For shrouded turbofan engines it is desirable to shield aft-radiated fan and jet noise and hot core jet plume infrared radiation. Accordingly, the generally preferred surface geometries may be biased toward the aft or rear of the propulsor. For turbofans, the vertical stabilizers may be used primarily for aft-fan noise and thermal radiation. In some cases, the vertical stabilizer planform and chord may be set based on infrared radiation, which may also accommodate noise considerations.

FIGS. 12-17 are views of another embodiment of an aircraft 140 in accordance with the present invention. The aircraft 140 may include a tubular fuselage 72 having a longitudinal axis 73 (FIG. 13), a pair of forward swept wings 74, 76, a pair of contra-rotating propeller, prop-fan engines 142, 144, a pair of vertical stabilizers 146, 148, an aft deck 86, 88 on each side of the fuselage 72 with pitch control surfaces 90, 92, and a pair of canards 150, 152.

The engines 142, 144 may be mounted above the forward swept wings 74, 76. The relative positions of the engines 142, 144 and wings 74, 76 may be selected to shield noise and heat from the ground to the degree possible while maintaining desired flight characteristics of the aircraft 140. The preferred forward sweep of the main wing is greater than about 25%, but less sweep can still be effective. The canards 150, 152 may be mounted lower than the longitudinal axis 73 of the aircraft 70, as shown, or higher than the axis as shown in FIGS. 5-10. The canards are shown with hinged control surfaces 158, 160.

Outboard of each outermost engine is a vertical stabilizer 146, 148. The vertical stabilizers may include rudders 154, 156 for directional control. As shown, the vertical stabilizers 146, 148 are taller than the uppermost point of the propellers, but the height may be as selected by one of ordinary skill in the art. One criterion may be for the vertical stabilizer 146, 148 to extend at least as high as the longitudinal axis of the highest engine, as measured at that engine's lowest point. The preferred acoustic geometry for vertical stabilizers 146, 148 is for the average geometric center of the vertical stabilizer 146, 148 to be oriented at the blade plane of rotation of the aft/downstream rotor. The vertical stabilizer span is preferably taller than the propeller diameter by a minimum of 5%. This is due to most of the acoustic energy being driven by inflow distortion into the downstream rotor.

Figure 18:
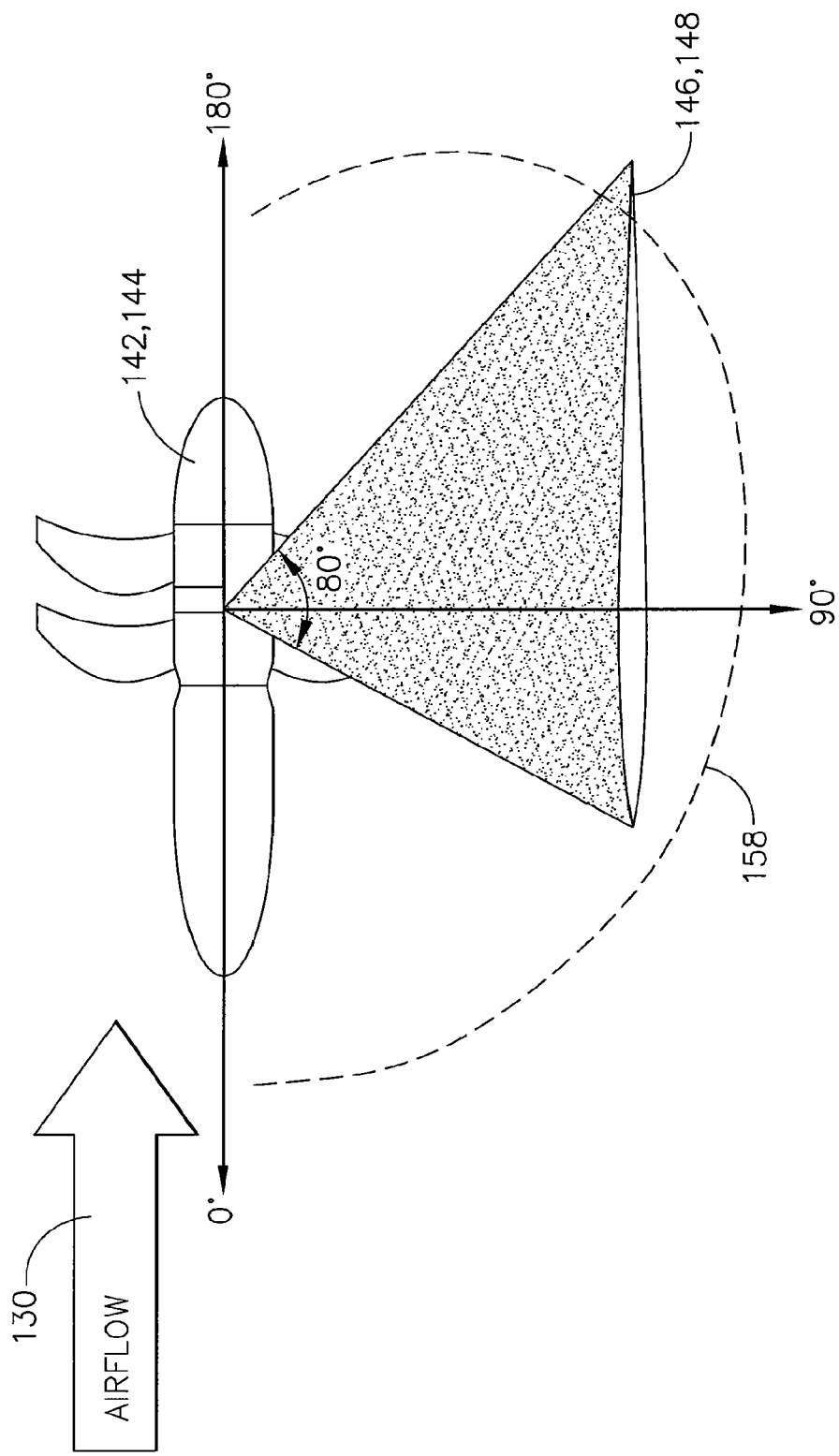
FIG. 18 is a top plan view of a contra-rotating propeller, prop-fan engine and vertical stabilizer of the airplane of FIG. 12.
Figure 19:
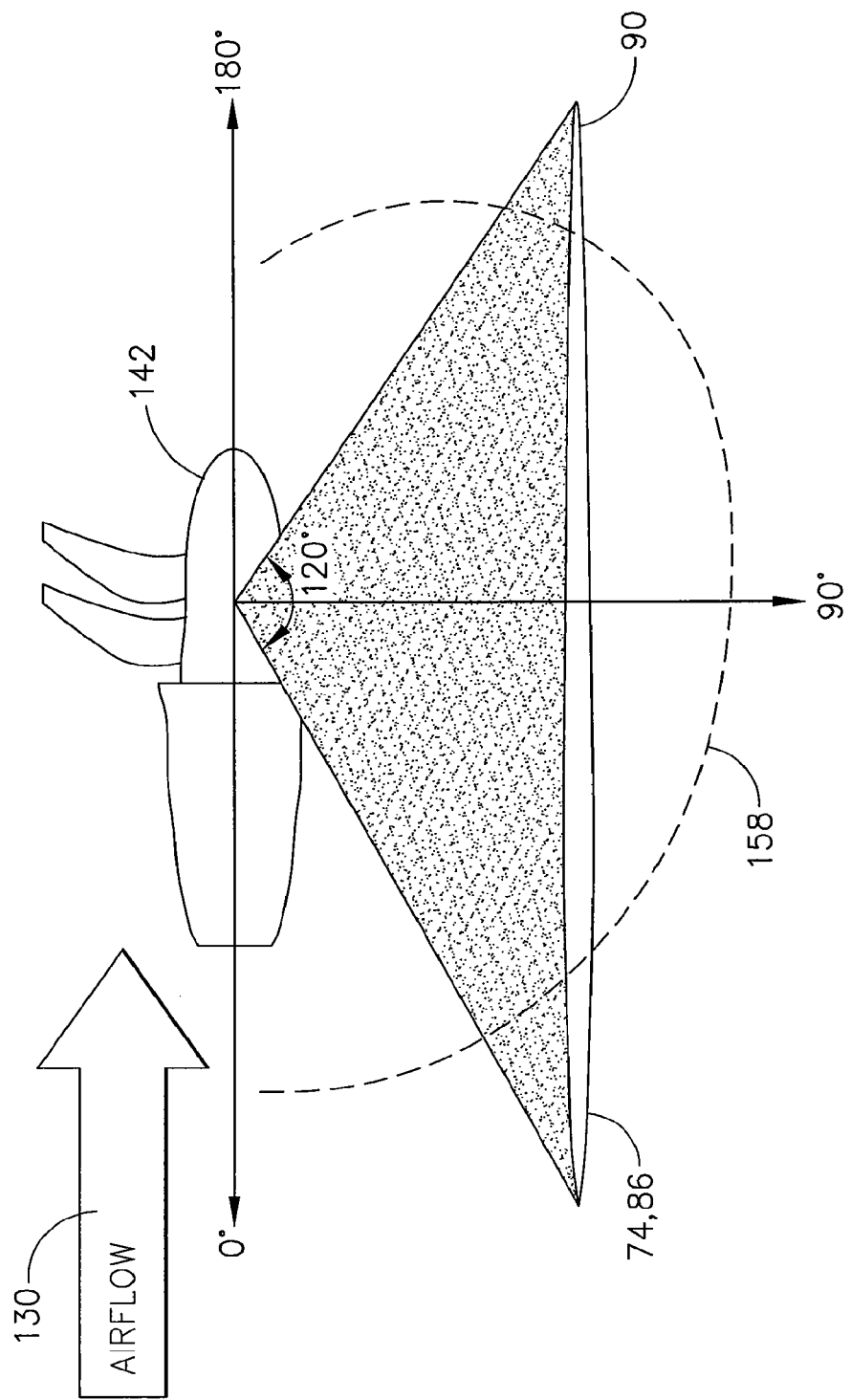
FIG. 19 is a side elevation view of a contra-rotating propeller, prop-fan engine, wing, and aft deck of the airplane of FIG. 12.

FIG. 18 shows a vertical stabilizer shielding lateral noise, with the minimum vertical stabilizer chord in a preferred embodiment shadowing a minimum of the peak 80 continuous degrees of acoustic radiation. Relative magnitude of sound is portrayed by the curved, dashed line 158. If forward wing sweep is being used in conjunction with the vertical stabilizers 146, 148 to shield lateral noise, shadowing by the vertical stabilizers 146, 148 preferably would not be provided farther forward than a 70 degree arc. A vertical (straight up & down) vertical stabilizer leading edge is preferred. As shown in FIG. 19, the horizontal beaver tail preferably shadows the peak 120 degrees of noise emission angle.

Figure 20:
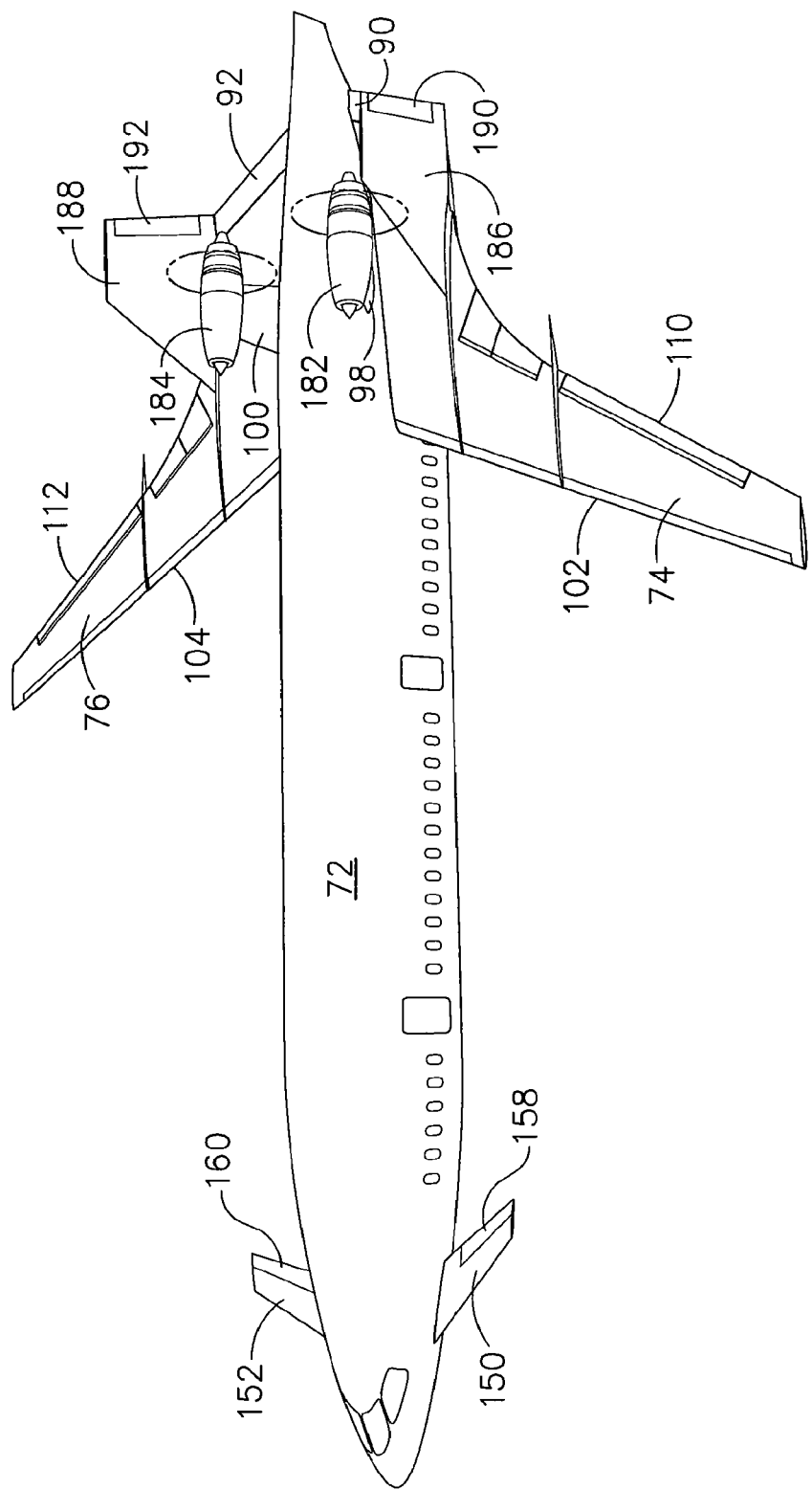
FIG. 20 is a downward perspective view of an airplane including turbo-prop engines in accordance with an embodiment of the present invention.
Figure 21:
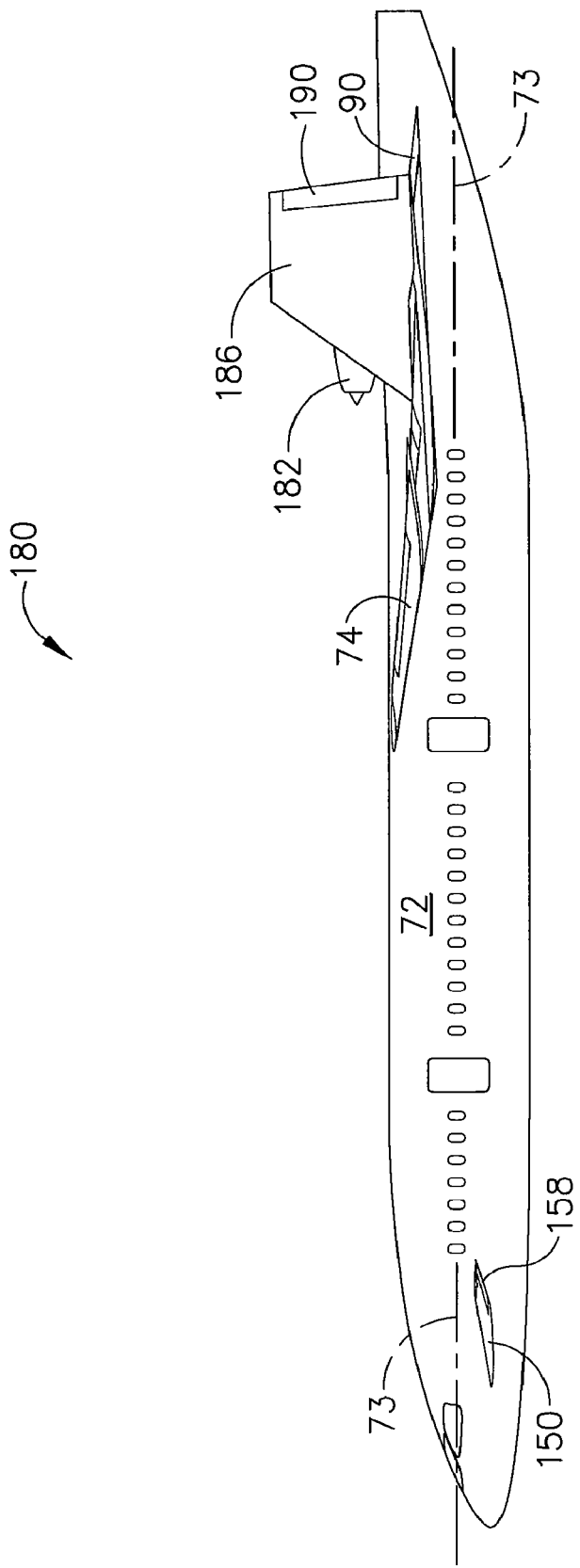
FIG. 21 is a side elevation view of the airplane of FIG. 20.

FIGS. 20 and 21 show another embodiment of an aircraft 180 in accordance with the present invention. The aircraft 180 may include a tubular fuselage 72 having a longitudinal axis 73 (FIG. 13), a pair of forward swept wings 74, 76, a pair of turbo-prop "pusher" engines 182, 184, a pair of vertical stabilizers 186, 188, an aft deck 86, 88 on each side of the fuselage 72 with pitch control surfaces 90, 92, and a pair of canards 150, 152.

Outboard of each outermost engine are the vertical stabilizers 186, 188. The vertical stabilizers may include rudders 190, 192 for directional control. The vertical stabilizers 190, 192 may be designed based on similar criteria as the vertical stabilizers 146, 148 for the contra-rotating prop-fan engines 142, 144. The leading and trailing edges of the vertical stabilizers 190, 192, however, may have a greater amount of sweep, although preferably a relatively low amount.

Figure 22:
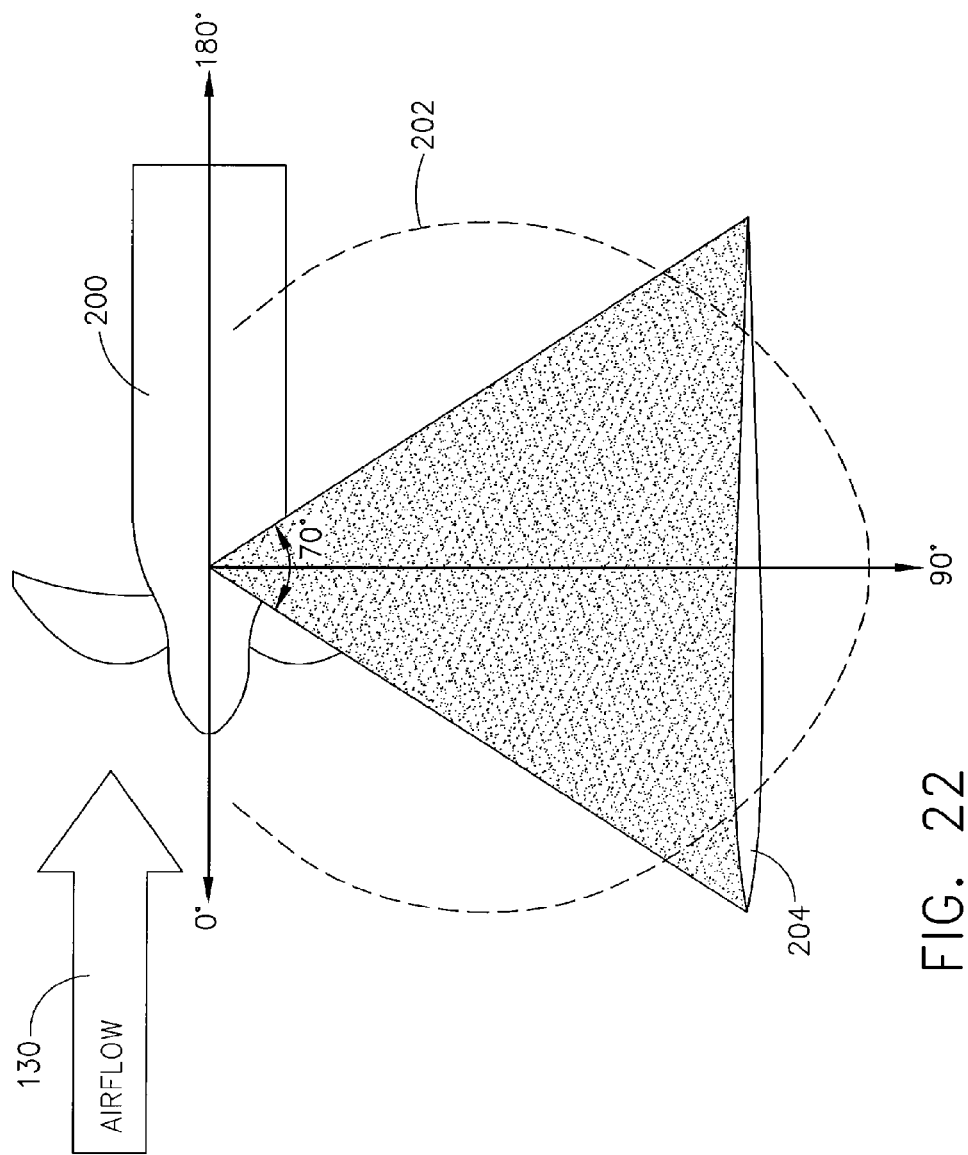
FIG. 22 is a top plan view of a turbo-prop engine and vertical stabilizer in accordance with an embodiment of the present invention.

Un-shrouded, un-ducted single rotation turbo-props tend to concentrate most of their acoustic energy near the plane of rotation at the blade tip. FIG. 22 shows such a "tractor" turbo-prop 200, with the relative magnitude of sound indicated by the dashed line 202. The preferred acoustic shielding geometry for associated vertical stabilizers 204 is for the average geometric center of the vertical stabilizer 204 to be oriented at the blade plane of rotation. In cases with high forward or trailing edge sweep, judgment of the designer can be applied, but a general bias toward the center of the tip chord as a reference may be preferable. The minimum vertical stabilizer chord preferably shadows the peak 70 continuous degrees emission angle of lateral acoustic radiation from root to tip. The vertical stabilizer tip span is preferably higher than the propeller diameter by a minimum of 5% of the propeller diameter from propeller tip to vertical stabilizer. The vertical stabilizers for the prop-fan engines 182, 184 may be similarly designed.

The forward sweep of the vertical tail is preferably limited such that the minimum chord of the vertical stabilizer maintains the minimum 70 degree criteria. The aft-deck horizontal/beavertail geometry may be dictated by structural and aerodynamic considerations rather than acoustic needs. For acoustics, the forward sweep of the main wing is preferably greater than zero, but unlike other propulsion systems, this angle is not strongly driven by acoustics due to their highly directive noise characteristics.

Figure 23:
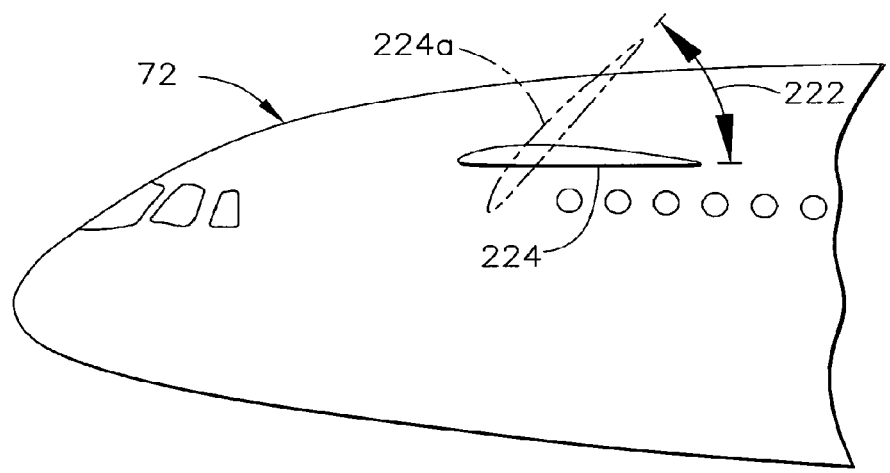
FIG. 23 is a side elevation view of a portion of an airplane and a canard in accordance with an embodiment of the present invention.
Figure 24:
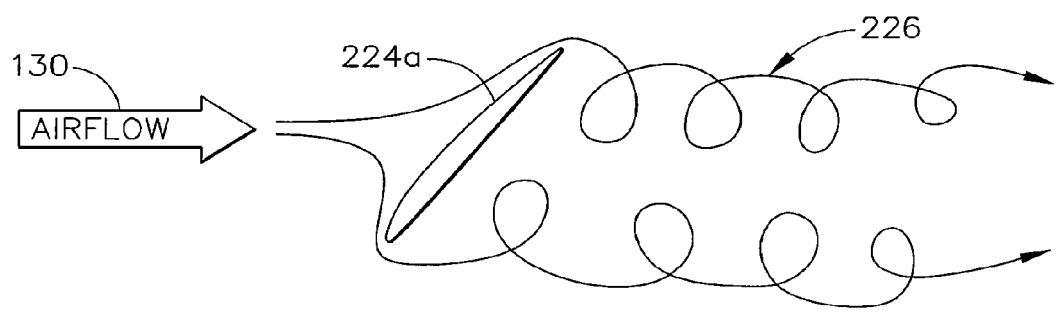
FIG. 24 is a side elevation view of the canard of FIG. 23, showing operational characteristics.

An alternative canard design is a fully rotatable, all flying canard, which is a design whereby the entire canard rotates about a central axis that is horizontal or nearly horizontal and extends laterally from the fuselage, providing significant control authority. FIGS. 23 and 24 show a fully rotatable, all flying canard 220 mounted to an aircraft 72, rotated 222 to be at an angle to the freestream 224 at an orientation 224a. Such a canard could potentially be used as a braking device during runway deceleration. The span and design of the canard tip may be chosen specifically so that tip vortices 226 are either greatly mitigated or managed such that there is minimal risk of vortex ingestion into the engines. A high mount canard may feature an articulated design that folds out of the way of the passenger boarding bridge, and a low-mount canard design may be tailored (for example, with a slight anhedral degree) so that it slips in under the passenger boarding bridge.

Figure 25:
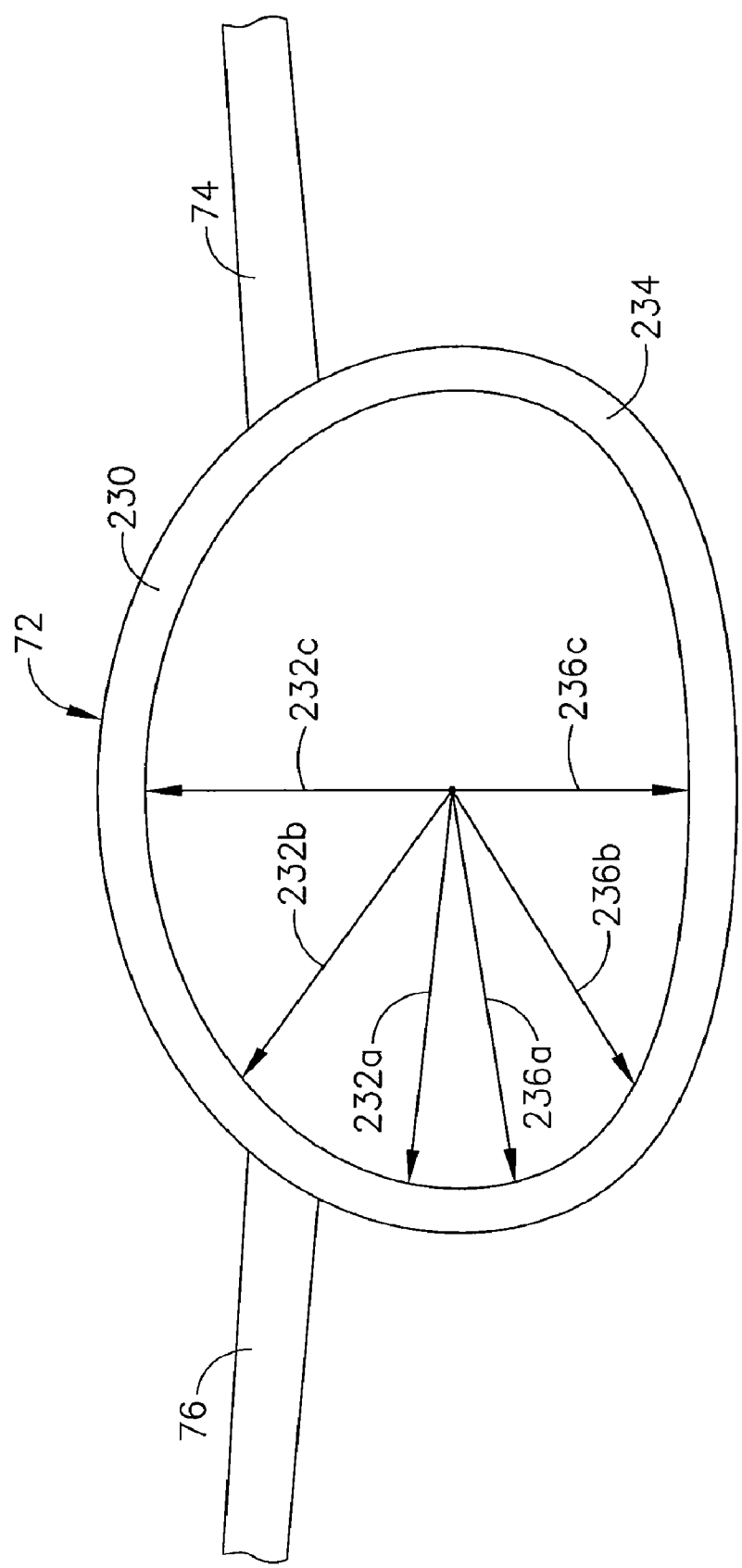
FIG. 25 is a cross-section view of a fuselage in accordance with an embodiment of the present invention.

The tubular fuselage 72, shown as circular in cross-section, may be circular, elliptical, or other aerodynamic shape. FIG. 25 shows a fuselage 72 in accordance with an embodiment of the present invention. The fuselage 72 may include an upper fuselage portion 230. The upper fuselage portion 72 may include a first, non-circular cross-section defined by a first set of varying radii of curvature 232. The first set of varying radii of curvature 232 may include at least three different radii of curvature 232a-232c, or the radii may be continuously changing as with an ellipse. The fuselage structure 72 may also include a lower fuselage portion 234. The lower fuselage portion 234 may include a second, non-circular cross-section defined by a second set of varying radii of curvature, which may be, for example, at least three radii of curvature 236a-236c, or the radii may be continuously changing as with an ellipse. The first set of varying radii 232 may be different from the second set of varying radii 236. Accordingly, the first cross-section may be different from the second cross-section. The bottom of the lower fuselage portion 234 may be substantially flattened as shown in FIG. 25 to provide added aircraft rotational clearance for take-off and landing compared to a conventional substantially circular cross-sectional fuselage.

An elliptical or flattened cross-section may increase the width of the fuselage 72, allowing more seats in each row, and in turn permits more passengers to be accommodated than with a circular cross-section. Accordingly, an elliptical or flattened shape permits the same number of passengers as a circular cross-section within a shorter length of passenger compartment. This adds to available space for cargo at the rear of the aircraft 70 or provides for reduction of the length of the aircraft 70. The additional aircraft rotational clearance may permit the use of shorter landing gear and a lighter overall structural weight, allowing main landing gear stowage without the need for heavy, drag inducing wing-to-body fairings Specific embodiments of an invention are described herein. One of ordinary skill in the aerospace field will recognize that the invention may be applied in a variety of aircraft designs. In certain embodiments, a single airplane offering could be modified in relatively minor ways using modular components to accommodate noise and thermal shielding for a variety of engine types. Many embodiments and implementations are possible. This application is intended to cover any adaptations or variations of the present invention. The following claims are in no way intended to limit the scope of the invention to the specific embodiments described.

What is claimed is:

1. An aircraft comprising:
a tubular fuselage having a longitudinal axis;
two main wings mounted to the tubular fuselage, each main wing in a substantially forward swept wing configuration and including a leading edge, a trailing edge, and an upper surface;
a plurality of engines each with at least one unshrouded propeller, each engine mounted to the aircraft and including a leading end and a trailing end, wherein each engine has a central longitudinal axis that is directly above one of the two main wings, the engines and propellers completely above the main wings;
an aft deck including a trailing edge and an upwardly rotatable pitch control surface at the trailing edge of the aft deck, the upwardly rotatable pitch control surface including a trailing edge; and
a vertical stabilizer mounted outboard of each outermost engine at a vertical stabilizer mounting location at least in part on a respective main wing, at least in part on the aft deck, or a combination thereof, each vertical stabilizer including a tip, a base, and a trailing edge,
wherein each vertical stabilizer extends higher than the uppermost point of any propeller of the respective engine,
wherein the leading edge of each main wing extends forward of the leading end of each respective engine at a location along the central longitudinal axis of each engine, and
wherein the trailing edge of the aft deck extends aft of the trailing end of each engine along the central longitudinal axis of each engine at least a distance as great as the distance from the upper surface of each main wing to the uppermost point of any propeller of the respective outermost engine.

2. The aircraft of claim 1, wherein the engines are prop-fan engines, each prop-fan engine being dual propeller, contra-rotating, including a front propeller and an aft propeller.

3. The aircraft of claim 2, wherein each propeller has an associated rotor, and wherein the main wings, aft deck, and upwardly rotatable pitch control surface extend to shadow at least about 120 continuous degrees of acoustic radiation as measured from a grid origin on the central longitudinal axis of each engine proximate to the front propeller rotor.

4. The aircraft of claim 2, wherein each propeller has an associated rotor, and wherein the vertical stabilizers at their respective bases shadow at least about 70 continuous degrees of acoustic radiation as measured from a grid origin on the central longitudinal axis of each engine proximate to the front propeller rotor.

5. The aircraft of claim 2, wherein the minimum chord of each vertical stabilizer is at least twice the distance between the center of the front propeller and center of the aft propeller.

6. The aircraft of claim 1, wherein the fuselage extends longitudinally between the engines and tapers to an end aft of the trailing edge of the pitch control surface.

7. The aircraft of claim 1, wherein the aft deck is split to be laterally on each side of the fuselage, and the upwardly rotatable pitch control surface is multi-element.

8. The aircraft of claim 1, wherein the upwardly rotatable pitch control surface extends in a span along the trailing edge of the aft deck on each side of the fuselage approximately from the fuselage to the base of the trailing edge of each vertical stabilizer.

9. The aircraft of claim 1, wherein energy radiated radially by the propellers is shielded primarily by the vertical stabilizers, aft deck, and fuselage.

10. The aircraft of claim 1, wherein the propellers each rotate substantially in a plane and wherein acoustic energy and infrared radiation radiated aft of the planes of rotation of the propellers are shielded by the aft deck, vertical stabilizers, and upwardly rotatable pitch control surface.

11. The aircraft of claim 1, wherein the propellers each rotate substantially in a plane and wherein energy radiated forward of the planes of rotation of the propellers is shielded by the main wing and fuselage.

12. The aircraft of claim 1, wherein energy radiated forward and laterally relative to the longitudinal axis of the fuselage is shielded with the wing and vertical stabilizers.

13. The aircraft of claim 1, wherein forward, underneath, lateral, and aft shielding of engine noise and infrared radiation are provided.

14. The aircraft of claim 1, wherein the height of each vertical stabilizer is at least about 5% of any propeller diameter higher than the uppermost point of any propeller.

15. The aircraft of claim 1, wherein the vertical stabilizers are canted outboard off of vertical from base to tip, wherein the canted vertical stabilizers reflect a portion of radiated energy upward.

16. The aircraft of claim 1, wherein each engine is mounted to, but not directly above, the fuselage with pylons, wherein the main wings are mounted to the aircraft substantially forward of the pylons, and wherein the trailing edge of each main wing blends into the respective vertical stabilizer.

17. The aircraft of claim 1, wherein the aircraft has an inside and an outside, wherein a passenger inside the aircraft has multiple lines of sight to the outside of the aircraft, and wherein no line of sight at any time provides a forward facing seated passenger with a view of any part of any engine mounted to the aircraft.

18. The aircraft of claim 1, wherein the main wings each have a wing tip, and the leading edge of each wing extends from the fuselage to the respective wing tip along a substantially straight line in top plan view.

19. The aircraft of claim 1, wherein each propeller has an associated rotor, and wherein the main wings, aft deck, and upwardly rotatable pitch control surface extend to shadow at least about 120 continuous degrees of acoustic radiation as measured from a grid origin on the central longitudinal axis of each engine proximate to any forwardmost rotor.

20. The aircraft of claim 1, wherein each propeller has an associated rotor, and wherein the vertical stabilizers at their respective bases each shadow at least about 70 continuous degrees of acoustic radiation as measured from a grid origin on the central longitudinal axis of each engine proximate to any forwardmost rotor.

21. The aircraft of claim 1, wherein the geometric center of the tip of each vertical stabilizer is located at any forwardmost propeller blade plane of rotation.

22. The aircraft of claim 1, wherein the engines are turboprop engines.

23. The aircraft of claim 22, wherein each propeller has an associated rotor, and wherein the vertical stabilizers at their respective bases each shadow at least about 70 continuous degrees of acoustic radiation as measured from a grid origin on the central longitudinal axis of each engine proximate to the associated rotor.

24. The aircraft of claim 22, wherein the geometric center of the tip of each vertical stabilizer is located at the propeller blade plane of rotation.

* * * * *